United States Patent
Liu et al.

(10) Patent No.: US 12,218,862 B2
(45) Date of Patent: Feb. 4, 2025

(54) METHOD AND DEVICE IN NODES USED FOR WIRELESS COMMUNICATION

(71) Applicants: Jin Liu, Shanghai (CN); Xiaobo Zhang, Shanghai (CN)

(72) Inventors: Jin Liu, Shanghai (CN); Xiaobo Zhang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 362 days.

(21) Appl. No.: 17/876,564

(22) Filed: Jul. 29, 2022

(65) Prior Publication Data
US 2023/0022606 A1 Jan. 26, 2023

Related U.S. Application Data

(63) Continuation of application No. PCT/CN2021/073016, filed on Jan. 21, 2021.

(30) Foreign Application Priority Data

Jan. 31, 2020 (CN) .......................... 202010077729.4

(51) Int. Cl.
*H04W 72/04* (2023.01)
*H04L 5/00* (2006.01)
(Continued)

(52) U.S. Cl.
CPC .......... *H04L 5/0005* (2013.01); *H04L 5/0048* (2013.01); *H04W 74/0833* (2013.01); *H04W 76/25* (2018.02)

(58) Field of Classification Search
CPC ... H04L 5/0005; H04L 5/0048; H04L 5/0053; H04L 5/0094; H04W 74/0833;
(Continued)

(56) References Cited

U.S. PATENT DOCUMENTS

2019/0141753 A1* 5/2019 Lin .................. H04W 74/0833
2019/0159197 A1* 5/2019 Shrestha ............... H04W 72/21

FOREIGN PATENT DOCUMENTS

| CN | 110300452 A | 10/2019 |
| CN | 110324862 A | 10/2019 |

(Continued)

OTHER PUBLICATIONS

Samsung (R1-1700892, "NR 2-step random access procedure") (Year: 2017).*
(Continued)

*Primary Examiner* — Maharishi V Khirodhar

(57) ABSTRACT

A first node transmits a first signal; receives a second signal; and transmits a third signal on a target time-frequency resource block; the second signal is used to indicate a first time-frequency resource block, the first time-frequency resource block is used to determine a target time-frequency resource set, and the first time-frequency resource block is one of the multiple time-frequency resource blocks comprised in the target time-frequency resource set; the target time-frequency resource block is one of the multiple time-frequency resource blocks comprised in the target time-frequency resource set, and whether the third signal carries a first-type information block is used to determine the target time-frequency resource block out of the target time-frequency resource set; the first-type information block comprises control-plane information. The present application transmits a Message 3 through additional time-frequency resources to reduce the conflict of random access to mainstream services.

20 Claims, 7 Drawing Sheets

(51) Int. Cl.
*H04W 74/0833* (2024.01)
*H04W 76/00* (2018.01)
*H04W 76/25* (2018.01)
*H04W 88/08* (2009.01)

(58) Field of Classification Search
CPC ... H04W 76/25; H04W 72/044; H04W 72/20; H04W 72/0446; H04W 72/0453; H04W 74/085
USPC .......................................................... 370/329
See application file for complete search history.

(56) References Cited

FOREIGN PATENT DOCUMENTS

| CN | 110679198 A | 1/2020 |
|----|-------------|--------|
| WO | 2019200519 A1 | 10/2019 |

OTHER PUBLICATIONS

ZTE (R2-1905630, "Detailed procedure for RACH report in NB-IoT") (Year: 2019).*
CN202010077729.4 Notification to Grant Patent Right for Invention dated Mar. 29, 2022.
CN202010077729.4 First Search Report dated Mar. 22, 2022.
ISR received in application No. PCT/CN2021/073016 dated Apr. 23, 2021.
ZTE Corporation, Nokia, Nokia Shanghai Bell "ZTE Corporation, Nokia, Nokia Shanghai Bell" 3GPP TSG-RAN2 meeting#106 R2-1905630 May 17, 2019.
Samsung "NR 2-step random access procedure" 3GPP TSG RAN WG1 NR Ad Hoc R1-1700892 Jan. 10, 2017.

* cited by examiner

METHOD AND DEVICE IN NODES USED FOR WIRELESS COMMUNICATION

CROSS REFERENCE TO RELATED APPLICATIONS

This application is the continuation of International patent application PCT/CN2021/073016, filed on Jan. 21, 2021, which claims the priority benefit of Chinese Patent Application No. 202010077729.4, filed on Jan. 31, 2020, the full disclosure of which is incorporated herein by reference.

BACKGROUND

Technical Field

The present application relates to transmission methods and devices in wireless communication systems, and in particular to a transmission scheme and device related to large connection of small data in wireless communications.

Related Art

Application scenarios of future wireless communication systems are becoming increasingly diversified, and different application scenarios have different performance demands on systems. In order to meet different performance requirements of various application scenarios, the 3rd Generation Partner Project (3GPP) Radio Access Network (RAN) #72 plenary decided to conduct the study of New Radio (NR), or what is called fifth Generation (5G). The work Item (WI) of NR was approved at the 3GPP RAN #75 plenary to standardize the NR.

With the rise of small data services, 3GPP started the standard formulation and research work under the framework of NR at 3GPP RAN #86th meeting. Small and sparse data services comprise smartphone applications and dumb-phone applications, among which, smartphone-related applications comprise instant messaging services (e.g., WhatsApp, QQ, WeChat, etc.), cardiac pacing and life support services, as well as push notification services; dumbphone-related applications comprise services of wearable devices (such as periodic positioning information), sensors (periodic or event triggered temperature and pressure report), and smart meters.

SUMMARY

In traditional communication systems, even in NR Release-15 and Release-16 systems, a User Equipment (UE) needs to be in a Radio Resource Control (RRC) CONNECTED State to perform data transmissions. Even though the NR release-16 version supports an RRC INACTIVE State, it does not support the UE to perform data transmissions in the RRC INACTIVE State. If the UE in the RRC INACTIVE State has a service demand for data transmissions, it needs to establish or resume the RRC CONNECTED State before data transmissions, which will inevitably bring a lot of signaling overhead and power consumption. Therefore, NR supports the UE to perform sparse data transmissions in the RRC INACTIVE State, and it is a practical idea to carry small data in a random access procedure. Since a number of users of small data services is generally large, and if the data transmission demands break out at the same time within a certain time, serious random access conflicts will be caused to the users of mainstream broadband services.

In view of the above problems, the present application discloses a small data transmission scheme, which can not only realize the data transmissions of the UE in the RRC INACTIVE State, but also can ensure the normal random access of the UE in the mainstream broadband services. It should be noted that the embodiments in a UE in the present application and characteristics of the embodiments may be applied to a base station if no conflict is incurred, and vice versa. And the embodiments in the present application and the characteristics in the embodiments can be arbitrarily combined if there is no conflict. Further, although the original intention of the present application is for the small data service, the present application can also be used for the mainstream eMBB services such as voice and large data.

Furthermore, though originally targeted at Uplink, the present application is also applicable to Sidelink. Though originally targeted at single-carrier communications, the present application is also applicable to multicarrier communications. Though originally targeted at single-antenna communications, the present application is also applicable to multi-antenna communications. Besides, the present application is not only targeted at scenarios of terminals and base stations, but also at V2X scenarios, terminals and relays as well as communication scenarios between relays and base stations, where similar technical effect can be achieved. Additionally, the adoption of a unified solution for various scenarios, including but not limited to V2X scenarios and communication scenarios between terminals and base stations, contributes to the reduction of hardware complexity and costs.

It should be noted that interpretations of the terminology in the present application refer to definitions given in the 3GPP TS36 series, TS37 series, TS38 series, as well as definitions given in Institute of Electrical and Electronics Engineers (IEEE) protocol specifications.

The present application provides a method in a first node for wireless communications, comprising:
  transmitting a first signal, the first signal carrying a first signature sequence;
  receiving a second signal, the second signal carrying a first identifier, the first signature sequence being used to indicate the first identifier; and
  transmitting a third signal on a target time-frequency resource block;
  herein, the second signal is used to indicate a first time-frequency resource block, the first time-frequency resource block is used to determine a target time-frequency resource set, the target time-frequency resource set comprises multiple time-frequency resource blocks, and the first time-frequency resource block is one of the multiple time-frequency resource blocks comprised in the target time-frequency resource set; the target time-frequency resource block is one of the multiple time-frequency resource blocks comprised in the target time-frequency resource set, and whether the third signal carries a first-type information block is used to determine the target time-frequency resource block out of the target time-frequency resource set; the first-type information block comprises C-Plane information.

In one embodiment, a problem to be solved in the present application is: how the NR system performs data transmissions in an RRC INACTIVE State.

In one embodiment, a method in the present application is establishing an association between the first time-frequency resource block and the target time-frequency resource block.

In one embodiment, a method in the present application is establishing an association between whether the third signal carries a first-type information block and determining the target time-frequency resource block.

In one embodiment, the above method is characterized in that the target time-frequency can be different from the first time-frequency resource block.

In one embodiment, the advantage of the above method is in transmitting the third signal through the target time-frequency resource block, thereby reducing conflicts of random access to mainstream services.

According to one aspect of the present application, the above method is characterized in that the first-type information block comprises one of RRC Setup Request, RRC Resume Request, RRC Resume Request1, RRC Reestablishment Request, RRC Reconfiguration Complete, RRC Handover Confirm or RRC Early Data Request.

According to one aspect of the present application, the above method is characterized in that the target time-frequency resource set comprises a positive integer number of first-type time-frequency resource block(s) and a positive integer number of second-type time-frequency resource block(s); when the third signal carries the first-type information block, the target time-frequency resource block is one of the positive integer number of first-type time-frequency resource block(s) comprised in the target time-frequency resource set; when the third signal does not carry the first-type information block, the target time-frequency resource block is one of the positive integer number of second-type time-frequency resource block(s) comprised in the target time-frequency resource set.

According to one aspect of the present application, the above method is characterized in that a first bit block is used to generate the third signal, and a size of the first bit block is used to determine the target time-frequency resource block out of the target time-frequency resource set.

According to one aspect of the present application, the above method is characterized in that when the size of the first bit block is greater than a first threshold, the target time-frequency resource block is one of the positive integer number of first-type time-frequency resource block(s) comprised in the target time-frequency resource set; when the size of the first bit block is less than the first threshold, the target time-frequency resource block is one of the positive integer number of second-type time-frequency resource block(s) comprised in the target time-frequency resource set.

According to one aspect of the present application, the above method is characterized in comprising:
  receiving a first signaling;
  herein, the first signaling is used to indicate the positive integer number of second-type time-frequency resource block(s) comprised in the target time-frequency resource set, and the first time-frequency resource block is one of the positive integer number of first-type time-frequency resource block(s) comprised in the target time-frequency resource set; when the third signal does not carry the first-type information block, the size of the first bit block is used to determine the target time-frequency resource block out of the positive integer number of second-type time-frequency resource block(s).

According to one aspect of the present application, the above method is characterized in comprising:
  receiving a fourth signal;
  herein, the third signal comprises a first identity; both the first identity and the target time-frequency resource block is used to determine the fourth signal.

According to one aspect of the present application, the above method is characterized in that the first node is a UE.

According to one aspect of the present application, the above method is characterized in that the first node is a base station.

According to one aspect of the present application, the above method is characterized in that the first node is a relay node.

The present application provides a method in a second node for wireless communications, comprising:
  receiving a first signal, the first signal carrying a first signature sequence;
  transmitting a second signal, the second signal carrying a first identifier, the first signature sequence indicating the first identifier; and
  receiving a third signal on a target time-frequency resource block;
  herein, the second signal indicates a first time-frequency resource block, the first time-frequency resource block is used to determine a target time-frequency resource set, the target time-frequency resource set comprises multiple time-frequency resource blocks, and the first time-frequency resource block is one of the multiple time-frequency resource blocks comprised in the target time-frequency resource set; the target time-frequency resource block is one of the multiple time-frequency resource blocks comprised in the target time-frequency resource set, and whether the third signal carries a first-type information block is used to determine the target time-frequency resource block out of the target time-frequency resource set; the first-type information block comprises C-Plane information.

According to one aspect of the present application, the above method is characterized in that the first-type information block comprises one of RRC Setup Request, RRC Resume Request, RRC Resume Request1, RRC Reestablishment Request, RRC Reconfiguration Complete, RRC Handover Confirm or RRC Early Data Request.

According to one aspect of the present application, the above method is characterized in that the target time-frequency resource set comprises a positive integer number of first-type time-frequency resource block(s) and a positive integer number of second-type time-frequency resource block(s); when the third signal carries the first-type information block, the target time-frequency resource block is one of the positive integer number of first-type time-frequency resource block(s) comprised in the target time-frequency resource set; when the third signal does not carry the first-type information block, the target time-frequency resource block is one of the positive integer number of second-type time-frequency resource block(s) comprised in the target time-frequency resource set.

According to one aspect of the present application, the above method is characterized in that a first bit block is used to generate the third signal, and a size of the first bit block is used to determine the target time-frequency resource block out of the target time-frequency resource set.

According to one aspect of the present application, the above method is characterized in that when the size of the first bit block is greater than a first threshold, the target time-frequency resource block is one of the positive integer number of first-type time-frequency resource block(s) comprised in the target time-frequency resource set; when the size of the first bit block is less than the first threshold, the target time-frequency resource block is one of the positive integer number of second-type time-frequency resource block(s) comprised in the target time-frequency resource set.

According to one aspect of the present application, the above method is characterized in comprising:

transmitting a first signaling;

herein, the first signaling indicates the positive integer number of second-type time-frequency resource block(s) comprised in the target time-frequency resource set, and the first time-frequency resource block is one of the positive integer number of first-type time-frequency resource block(s) comprised in the target time-frequency resource set; when the third signal does not carry the first-type information block, the size of the first bit block is used to determine the target time-frequency resource block out of the positive integer number of second-type time-frequency resource block(s).

According to one aspect of the present application, the above method is characterized in comprising:

transmitting a fourth signal;

herein, the third signal comprises a first identity; both the first identity and the target time-frequency resource block are used to generate the fourth signal.

According to one aspect of the present application, the above method is characterized in that the second node is a UE.

According to one aspect of the present application, the above method is characterized in that the second node is a base station.

According to one aspect of the present application, the above method is characterized in that the second node is a relay node.

The present application provides a first node for wireless communications, comprising:

a first transmitter, transmitting a first signal, the first signal carrying a first signature sequence;

a first receiver, receiving a second signal, the second signal carrying a first identifier, the first signature sequence being used to indicate the first identifier; and the first transmitter, transmitting a third signal on a target time-frequency resource block;

herein, the second signal is used to indicate a first time-frequency resource block, the first time-frequency resource block is used to determine a target time-frequency resource set, the target time-frequency resource set comprises multiple time-frequency resource blocks, and the first time-frequency resource block is one of the multiple time-frequency resource blocks comprised in the target time-frequency resource set; the target time-frequency resource block is one of the multiple time-frequency resource blocks comprised in the target time-frequency resource set, and whether the third signal carries a first-type information block is used to determine the target time-frequency resource block out of the target time-frequency resource set; the first-type information block comprises C-Plane information.

The present application provides a second node for wireless communications, comprising:

a second receiver, receiving a first signal, the first signal carrying a first signature sequence;

a second transmitter, transmitting a second signal, the second signal carrying a first identifier, the first signature sequence indicating the first identifier; and receiving a third signal on a target time-frequency resource block;

herein, the second signal indicates a first time-frequency resource block, the first time-frequency resource block is used to determine a target time-frequency resource set, the target time-frequency resource set comprises multiple time-frequency resource blocks, and the first time-frequency resource block is one of the multiple time-frequency resource blocks comprised in the target time-frequency resource set; the target time-frequency resource block is one of the multiple time-frequency resource blocks comprised in the target time-frequency resource set, and whether the third signal carries a first-type information block is used to determine the target time-frequency resource block out of the target time-frequency resource set; the first-type information block comprises C-Plane information.

In one embodiment, the present application is advantageous in the following aspects:

the present application establishes an association between the first time-frequency resource block and the target time-frequency resource block.

the present application establishes an association between whether the third signal carries a first-type information block and determining the target time-frequency resource block.

in the present application, the target time-frequency can be different from the first time-frequency resource block.

the present application transmits the third signal through the target time-frequency resource block to reduce the conflicts of random access to mainstream services.

BRIEF DESCRIPTION OF THE DRAWINGS

Other features, objects and advantages of the present application will become more apparent from the detailed description of non-restrictive embodiments taken in conjunction with the following drawings.

DESCRIPTION OF THE EMBODIMENTS

The technical scheme of the present application is described below in further details in conjunction with the drawings. It should be noted that the embodiments of the present application and the characteristics of the embodiments may be arbitrarily combined if no conflict is caused.

Embodiment 1

Figure 1:
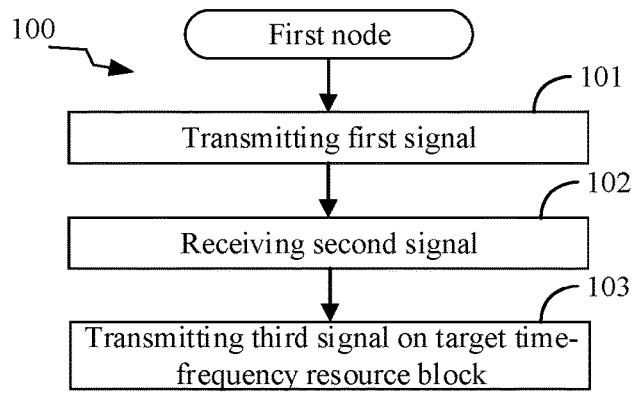
FIG. 1 illustrates a flowchart of the processing of a first node according to one embodiment of the present application.

Embodiment 1 illustrates a flowchart of the processing of a first node according to one embodiment of the present application, as shown in FIG. 1. In FIG. 1, each block represents a step.

In Embodiment 1, a first node in the present application first transmits a first signal in step 101; then receives a second signal in step 102; and transmits a third signal on a target time-frequency resource block in step 103; the first signal carries a first signature sequence; the second signal carries a first identifier, the first signature sequence is used to indicate the first identifier; and the second signal is used to indicate a first time-frequency resource block, the first time-frequency resource block is used to determine a target time-frequency resource set, the target time-frequency resource set comprises multiple time-frequency resource blocks, and the first time-frequency resource block is one of the multiple time-frequency resource blocks comprised in the target time-frequency resource set; the target time-frequency resource block is one of the multiple time-frequency resource blocks comprised in the target time-frequency resource set, and whether the third signal carries a first-type information block is used to determine the target time-frequency resource block out of the target time-frequency resource set; the first-type information block comprises C-Plane information.

In one embodiment, the first signal comprises a baseband signal.

In one embodiment, the first signal comprises a radio-frequency signal.

In one embodiment, the first signal comprises a radio signal.

In one embodiment, the first signal is transmitted on a Random Access Channel (RACH).

In one embodiment, the first signal is transmitted on a Physical Random Access Channel (PRACH).

In one embodiment, the first signal is transmitted on a Narrowband Physical Random Access Channel (NPRACH).

In one embodiment, the first signal is cell-specific.

In one embodiment, the first signal is UE-specific.

In one embodiment, the first signal comprises a Random Access Preamble.

In one embodiment, the first signal is Message 1 (Msg 1) in a Random Access Procedure.

In one embodiment, the first signal is Msg1 of Type-1 Random Access Procedure.

In one embodiment, the first signal is MsgA of Type-2 Random Access Procedure.

In one embodiment, for the specific meaning of the Type-1 Random Access Procedure, refer to section 8 in 3GPP TS38.213.

In one embodiment, for the specific meaning of the Type-2 Random Access Procedure, refer to section 8 in 3GPP TS38.213.

In one embodiment, the first signal carries a first signature sequence.

In one embodiment, the first signature sequence is used to generate the first signal.

In one embodiment, the first signature sequence is a pseudo-random sequence.

In one embodiment, the first signature sequence is a Gold sequence.

In one embodiment, the first signature sequence is an M sequence.

In one embodiment, the first signature sequence is a Zadeoff-Chu (ZC) sequence.

In one embodiment, the first signature sequence is a preamble.

In one embodiment, the first signature sequence is a long preamble.

In one embodiment, the first signature sequence is a short preamble.

In one embodiment, for the generation method of the first signature sequence, refer to section 6.3.3.1 in 3GPP TS38.211.

In one embodiment, a Subcarrier Spacing (SCS) of a subcarrier occupied by the first signature sequence in frequency domain is one of 1.25 kHz, 5 kHz, 15 kHz, 30 kHz, 60 kHz or 120 kHz.

In one embodiment, a length of the first signature sequence is 839, and an SCS of a subcarrier occupied by the first signature sequence is one of 1.25 kHz or 5 kHz.

In one embodiment, a length of the first signature sequence is 139, and an SCS of a subcarrier occupied by the first signature sequence is one of 15 kHz, 30 kHz, 60 kHz or 120 kHz.

In one embodiment, the first signature sequence comprises a positive integer number of first-type sub-sequence(s), and the positive integer number of first-type sub-sequence(s) is(are) Time-Division Multiplexing (TDM).

In one subembodiment of the above embodiment, the positive integer number of first-type sub-sequence(s) comprised in the first signature sequence is(are) the same.

In one subembodiment of the above embodiment, at least two first type sub-sequences among the positive integer number of first-type sub-sequences comprised in the first signature sequence are different.

In one embodiment, the first signature sequence is subjected to Discrete Fourier Transform (DFT), and then subjected to Orthogonal Frequency Division Multiplexing (OFDM) modulation processing.

In one embodiment, the first signature sequence obtains a first signal after sequentially subjected to Sequence Generation, DFT, Modulation and Resource Element Mapping, as well as wideband symbol generation.

In one embodiment, the second signal comprises a baseband signal.

In one embodiment, the second signal comprises a radio-frequency signal.

In one embodiment, the second signal comprises a radio signal.

In one embodiment, the second signal is transmitted on a Downlink Shared Channel (DL-SCH).

In one embodiment, the second signal is transmitted on a Physical Downlink Shared Channel (PDSCH).

In one embodiment, the second signal is transmitted on a Physical Downlink Control Channel (PDCCH).

In one embodiment, the second signal is transmitted on a PDCCH and a PDSCH.

In one embodiment, the first signal is transmitted on a PRACH and the second signal is respectively transmitted on a PDCCH and a PDSCH.

In one embodiment, the second signal is Cell-specific.

In one embodiment, the second signal is UE-specific.

In one embodiment, the second signal is broadcast.

In one embodiment, the second signal is groupcast.

In one embodiment, the second signal is unicast.

In one embodiment, the second signal comprises an RAR.

In one embodiment, the second signal comprises a Timing Advance Command.

In one embodiment, the second signal comprises an uplink grant.

In one embodiment, the second group comprises a Temporary Cell-RNTI (TC-RNTI).

In one embodiment, the first signal comprises a Random Access Preamble, and the second signal comprises an RAR.

In one embodiment, the first signal is Msg1 in a random access procedure, and the second signal is Msg2 in a random access procedure.

In one embodiment, the first signal is Msg1 in Type-1 Random Access Procedure, and the second signal is Msg2 in Type-1 Random Access Procedure.

In one embodiment, the first signal is MsgA in Type-2 Random Access Procedure, and the second signal is MsgB in Type-2 Random Access Procedure.

In one embodiment, the second signal comprises all or part of a Multimedia Access Control (MAC) layer signaling.

In one embodiment, the second signal comprises one or more fields in a MAC Control Element (CE).

In one embodiment, the second signal comprises one or more fields in a MAC Protocol Data Unit (PDU).

In one embodiment, the second signal is a MAC PDU.

In one embodiment, the second signal is a MAC subPDU.

In one embodiment, the second signal comprises all or part of a higher-layer signaling.

In one embodiment, the second signal comprises one or more fields in a PHY layer.

In one embodiment, the second signal comprises Downlink Control Information (DCI).

In one embodiment, the second signal carries the first identifier.

In one embodiment, the second signal comprises a MAC subPDU, and the MAC subPDU carries the first identifier.

In one embodiment, the second signal comprises a MAC subPDU, the MAC subPDU comprises a MAC subheader, and the MAC subheader carries the first identifier.

In one embodiment, the second signal comprises a MAC subPDU, the MAC subPDU comprises a MAC subheader and a MAC RAR, and the MAC subheader carries the first identifier.

In one embodiment, the second signal comprises a MAC subPDU, the MAC subPDU comprises a MAC subheader and a MAC RAR, and the MAC RAR carries the first identifier.

In one embodiment, the second signal comprises a MAC PDU, the MAC PDU comprises a MAC subheader and a MAC RAR, and the MAC subheader carries the first identifier.

In one embodiment, the second signal comprises a MAC subheader carrying the first identifier and a MAC RAR.

In one embodiment, the second signal comprises a MAC subheader and a MAC RAR carrying the first identifier.

In one embodiment, the second signal is scrambled by the first identifier.

In one embodiment, the first identifier is used to generate a scrambling sequence of the second signal.

In one embodiment, the first identifier is used to generate an initial value of a scrambling sequence of the second signal.

In one embodiment, the first identifier is used to identify the first signature sequence.

In one embodiment, the first identity is used to identify the first signal.

In one embodiment, the first signature sequence is used to indicate the first identifier.

In one embodiment, the first signature sequence corresponds to the first identifier.

In one embodiment, the first identifier is a Random Access Preamble Identity (RAPID).

In one embodiment, the first identifier is an Extended RAPID.

In one embodiment, the first identifier is a TC-RNTI.

In one embodiment, the first identifier is a positive integer.

In one embodiment, the first identifier is one of at least one first-type identifier.

In one embodiment, the first identifier is a positive integer from 1 to 64.

In one embodiment, the first identifier is a positive integer from 0 to 63.

In one embodiment, the first identifier comprises a positive integer number of bit(s).

In one embodiment, the first identifier comprises 8 bits.

In one embodiment, the first signature sequence is one of a positive integer number of signature sequence(s), the positive integer number of signature sequence(s) corresponds (respectively correspond) to the positive integer number of first-type identifier(s), the first identifier is one of the positive integer number of first-type identifier(s), and the first signature sequence is used to indicate the first identifier out of the positive integer number of first-type identifier(s).

In one embodiment, the third signal comprises a baseband signal.

In one embodiment, the third signal comprises a radio-frequency signal.

In one embodiment, the third signal comprises a radio signal.

In one embodiment, the third signal is transmitted on an Uplink Shared Channel (UL-SCH).

In one embodiment, the third signal is transmitted on a Physical Uplink Shared Channel (PUSCH).

In one embodiment, the third signal is transmitted on a Physical Uplink Control Channel (PUCCH).

In one embodiment, a channel occupied by the first signal comprises a PRACH, a channel occupied by the second signal comprises a PDSCH, and a channel occupied by the third signal comprises a PUSCH.

In one embodiment, the first signal is transmitted on a PRACH, the second signal is transmitted on a PDSCH, and the third signal is transmitted a PUSCH.

In one embodiment, the first signal is transmitted on a PRACH, the second signal is transmitted on a PDCCH and a PDSCH, and the third signal is transmitted a PUSCH.

In one embodiment, the third signal comprises all or part of a higher-layer signaling.

In one embodiment, the third information comprises all or part of an RRC layer signaling.

In one embodiment, the third information comprises one or more fields in a RRC Information Element (IE).

In one embodiment, the third signal comprises all or part of a MAC layer signaling.

In one embodiment, the third signal comprises one or more fields of a MAC CE.

In one embodiment, the third information comprises one or more fields of a PHY layer.

In one embodiment, the third signal comprises RRC connection related information.

In one embodiment, the third signal comprises small data.

In one embodiment, the third signal comprises Control-Plane (C-Plane) information.

In one embodiment, the third signal comprises User-Plane (U-Plane) information.

In one embodiment, the third signal comprises an RRC message.

In one embodiment, the third signal comprises a Non Access Stratum (NAS) message.

In one embodiment, the third signal comprises Service Data Adaptation Protocol (SDAP) data.

In one embodiment, the third signal is Msg3 of a random access procedure.

In one embodiment, the third signal is Msg3 of Type-1 Random Access Procedure.

In one embodiment, the first signal comprises a random access preamble, the second signal comprises an RAR, and the third signal comprises RRC connection related information.

In one embodiment, the first signal comprises a random access preamble, the second signal comprises an RAR, and the third signal comprises small data.

In one embodiment, the first signal comprises a random access preamble, the second signal comprises an RAR, and the third signal comprises C-Plane information.

In one embodiment, the first signal comprises a random access preamble, the second signal comprises an RAR, and the third signal comprises U-Plane information.

In one embodiment, the first signal comprises a random access preamble, the second signal comprises an RAR, and the third signal comprises an RRC message.

In one embodiment, the first signal comprises a random access preamble, the second signal comprises an RAR, and the third signal comprises SDAP data.

In one embodiment, the first signal comprises a random access preamble, the second signal comprises an RAR, and the third signal comprises a NAS message.

In one embodiment, the first signal is Msg1 in a random access procedure, the second signal is Msg2 in a random access procedure, and the third signal is Msg3 in a random access procedure.

In one embodiment, the first signal is Msg1 in Type-1 Random Access Procedure, and the second signal is Msg2 in Type-1 Random Access Procedure, and the third signal is Msg3 of Type-1 Random Access Procedure.

In one embodiment, the RRC connection related information comprises at least one of RRC Setup Request, RRC Resume Request, RRC Resume Request1, RRC Reestablishment Request, RRC Reconfiguration Complete, RRC Handover Confirm or RRC Early Data Request.

In one embodiment, the RRC connection related information comprises an RRC connection request.

In one embodiment, the RRC connection related information comprises an RRC Connection Resume Request.

In one embodiment, the RRC connection related information comprises an RRC Connection Re-establishment.

In one embodiment, the RRC connection related information comprises an RRC Handover Confirm.

In one embodiment, the RRC connection related information comprises an RRC Connection Reconfiguration Complete.

In one embodiment, the RRC connection related information comprises an RRC Early Data Request.

In one embodiment, the RRC connection related information comprises an RRC Setup Request.

In one embodiment, the RRC connection related information comprises an RRC Resume Request.

In one embodiment, the RRC connection related information comprises an RRC Resume Request1.

In one embodiment, the RRC connection related information comprises an RRC Reestablishment Request.

In one embodiment, the RRC connection related information comprises an RRC Reconfiguration Complete.

In one embodiment, a first bit block comprises a positive integer number of bit(s), and the third signal comprises all or partial bit(s) in the first bit block.

In one embodiment, a first bit block is used to generate the third signal, and the first bit block comprises a positive integer number of bit(s).

In one embodiment, the first bit block comprises a positive integer number of bit(s), and all or partial bit(s) in the positive integer number of bit(s) is(are) used to generate the third signal.

In one embodiment, the first bit block comprises one Codeword (CW).

In one embodiment, the first bit block comprises one Code Block (CB).

In one embodiment, the first bit block comprises one Code Block Group (CBG).

In one embodiment, the first bit block comprises one Transport Block (TB).

In one embodiment, the third signal is obtained after all or partial bit(s) of the first bit block is(are) sequentially subjected to transport block-level Cyclic Redundancy Check (CRC) attachment, Code Block Segmentation, code block-level CRC attachment, Channel Coding, Rate Matching, Code Block Concatenation, Scrambling, Modulation, Layer Mapping, Antenna Port Mapping, Mapping to Physical Resource Blocks, Baseband Signal Generation and Modulation and Upconversion.

In one embodiment, the third signal is an output after the first bit block is sequentially subjected to a modulation mapper, a layer mapper, precoding, a resource element mapper, and multicarrier symbol generation.

In one embodiment, the channel coding is based on a polar code.

In one embodiment, the channel coding is based on a Low-density Parity-Check (LDPC) code.

In one embodiment, only the first bit block is used to generate the third signal.

In one embodiment, there exists a bit block other than the first bit block being used to generate the third signal.

In one embodiment, the first bit block comprises U-Plane information.

In one embodiment, the first bit block comprises data generated by a SDAP sub-layer.

In one embodiment, the first bit block comprises data generated by a NAS.

In one embodiment, the first bit block comprises a NAS message.

In one embodiment, the first bit block comprises C-Plane information.

In one embodiment, the first bit block comprises information generated by an RRC layer.

In one embodiment, the first bit block comprises an RRC message.

In one embodiment, the first bit block comprises the RRC connection related information.

In one embodiment, the first bit block comprises the small data.

In one embodiment, the first bit block comprises C-Plane information and U-Plane information.

In one embodiment, the first bit block comprises C-Plane information, and the first bit block does not comprise U-Plane information.

In one embodiment, the first bit block comprises U-Plane information, and the first bit block does not comprise C-Plane information.

In one embodiment, the first bit block comprises the RRC connection related information, and the first bit block does not comprise a NAS message.

In one embodiment, the first bit block comprises the RRC connection related information, and the first bit block does not comprise SDAP data.

In one embodiment, the first bit block comprises the RRC connection related information, and the first bit block does not comprise the small data.

In one embodiment, the first bit block comprises a NAS message, and the first bit block does not comprise an RRC message.

In one embodiment, the first bit block comprises a NAS message, and the first bit block does not comprise the RRC connection related information.

In one embodiment, the first bit block comprises SDAP data, and the first bit block does not comprise an RRC message.

In one embodiment, the first bit block comprises SDAP data, and the first bit block does not comprise the RRC connection related information.

In one embodiment, the first bit block comprises small data, and the first bit block does not comprise the RRC connection related information.

In one embodiment, a first bit block set is used to generate the third signal, the first bit block set comprises a positive integer number of first-type bit block(s), and any of a positive integer number of first-type bit block(s) comprised in the first bit block set comprises a positive integer number of bit(s).

In one subembodiment of the above embodiment, the first bit block is one of the positive integer number of first-type bit block(s) comprised in the first bit block set.

In one embodiment, the third signal comprises a first bit block set, the first bit block set comprises a positive integer number of first-type bit block(s), and any of the positive integer number of first-type bit block(s) comprised in the first bit block set comprises a positive integer number of bit(s).

In one subembodiment of the above embodiment, the first bit block is one of the positive integer number of first-type bit block(s) comprised in the first bit block set.

In one embodiment, the first bit block set comprises data transmitted on a UL-SCH.

In one embodiment, the first bit block set comprises data transmitted on an SL-SCH.

In one embodiment, one of the positive integer number of first-type bit block(s) comprised in the first bit block set comprises one CW.

In one embodiment, one of the positive integer number of first-type bit block(s) comprised in the first bit block set comprises one CB.

In one embodiment, one of the positive integer number of first-type bit block(s) comprised in the first bit block set comprises one CBG.

In one embodiment, one of the positive integer number of first-type bit block(s) comprised in the first bit block set comprises one TB.

In one embodiment, the first radio signal is obtained after all or partial bit(s) in the first bit block set is(are) sequentially subjected to TB-level CRC attachment, Code Block Segmentation, Code Block-level CRC Attachment, Channel Coding, Rate Matching, Code-Block Concatenation, Scrambling, Modulation, Layer Mapping, Antenna Port Mapping, Mapping to Physical Resource Blocks, Baseband Signal Generation as well as Modulation and Upconversion.

In one embodiment, the third signal is an output after the first bit block set is sequentially subjected to a modulation mapper, a layer mapper, precoding, an RE mapper and multicarrier symbol generation.

In one embodiment, only the first bit block set is used to generate the third signal.

In one embodiment, there exists a bit block other than the first bit block set being used to generate the third signal.

In one embodiment, the first bit block set comprises U-Plane information.

In one embodiment, the first bit block set comprises data generated by a SDAP sub-layer.

In one embodiment, the first bit block set comprises data generated by NAS.

In one embodiment, the first bit block set comprises a NAS message.

In one embodiment, the first bit block set comprises C-Plane information.

In one embodiment, the first bit block set comprises information generated by an RRC layer.

In one embodiment, the first bit block set comprises an RRC message.

In one embodiment, the first bit block set comprises the RRC connection related information.

In one embodiment, the first bit block set comprises the small data.

In one embodiment, the first bit block set comprises C-Plane information and U-Plane information.

In one embodiment, the first bit block set comprises C-Plane information, and the first bit block set does not comprise U-Plane information.

In one embodiment, the first bit block set comprises U-Plane information, and the first bit block set does not comprise C-Plane information.

In one embodiment, the first bit block set comprises the RRC connection related information, and the first bit block set does not comprise a NAS message.

In one embodiment, the first bit block set comprises the RRC connection related information, and the first bit block set does not comprise SDAP data.

In one embodiment, the first bit block set comprises the RRC connection related information, and the first bit block set does not comprise the small data.

In one embodiment, the first bit block set comprises a NAS message, and the first bit block set does not comprise an RRC message.

In one embodiment, the first bit block set comprises a NAS message, and the first bit block set does not comprise the RRC connection related information.

In one embodiment, the first bit block set comprises SDAP data, and the first bit block set does not comprise an RRC message.

In one embodiment, the first bit block set comprises SDAP data, and the first bit block set does not comprise the RRC connection related information.

In one embodiment, the first bit block set comprises small data, and the first bit block set does not comprise the RRC connection related information.

Embodiment 2

Figure 2:
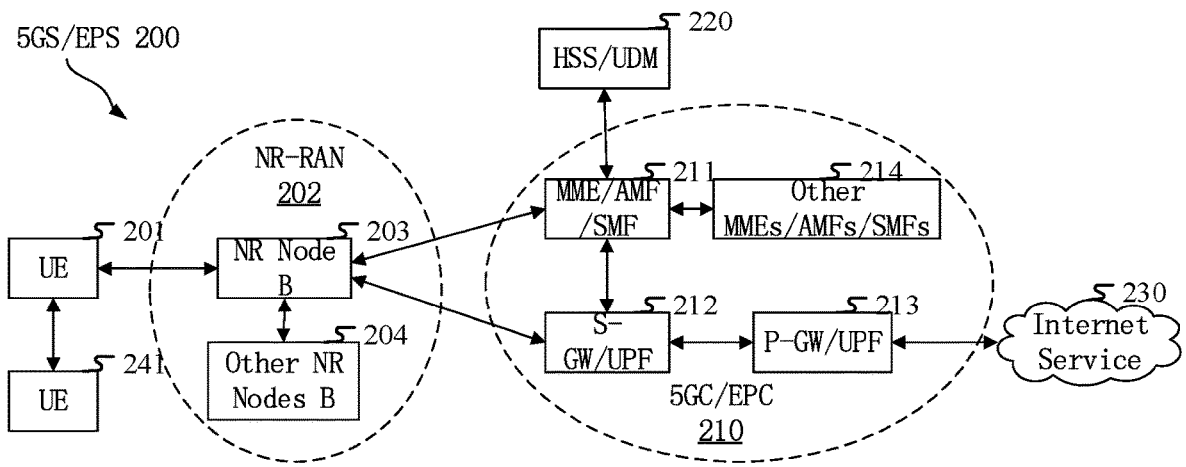
FIG. 2 illustrates a schematic diagram of a network architecture according to one embodiment of the present application.

Embodiment 2 illustrates a schematic diagram of a network architecture according to the present application, as shown in FIG. 2. FIG. 2 illustrates a network architecture 200 of 5G NR, Long-Term Evolution (LTE) and Long-Term Evolution Advanced (LTE-A) systems. The 5G NR or LTE network architecture 200 may be called a 5G System (5GS)/Evolved Packet System (EPS) 200 or other appropriate terms. The 5GS/EPS 200 may comprise one or more UEs 201, a UE 241 that is in Sidelink communications with a UE 201, an NG-RAN 202, a 5G-Core Network/Evolved Packet Core (5GC/EPC) 210, a Home Subscriber Server (HSS)/Unified Data Management (UDM) 220 and an Internet Service 230. The 5GS/EPS 200 may be interconnected with other access networks. For simple description, the entities/interfaces are not shown. As shown in FIG. 2, the 5GS/EPS 200 provides packet switching services. Those skilled in the art will readily understand that various concepts presented throughout the present application can be extended to networks providing circuit switching services or other cellular networks. The NG-RAN 202 comprises an NR node B (gNB) 203 and other gNBs 204. The gNB 203 provides UE 201-oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. In NTN networks, examples of gNB203 include satellites, aircrafts, or ground base stations relayed through satellites. The gNB 203 provides an access point of the 5GC/EPC 210 for the UE 201. Examples of the UE 201 include cellular phones, smart phones, Session Initiation Protocol (SIP) phones, laptop computers, Personal Digital Assistant (PDA), satellite Radios, non-terrestrial base station communications, Satellite Mobile Communications, Global Positioning Systems (GPS), multimedia devices, video devices, digital audio players (for example, MP3 players), cameras, game consoles, unmanned aerial vehicles (UAV), aircrafts, narrow-band Internet of Things (IoT) devices, machine-type communication devices, land vehicles, automobiles, wearable devices, or any other similar functional devices. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the 5GC/EPC 210 via an SI/NG interface. The 5GC/EPC 210 comprises a Mobility Management Entity (MME)/Authentication Management Field (AMF)/Session Management Function (SMF) 211, other MMEs/AMFs/SMFs 214, a Service Gateway (S-GW)/User Plane Function (UPF) 212 and a Packet Date Network Gateway (P-GW)/UPF 213. The MME/AMF/SMF 211 is a control node for processing a signaling between the UE 201 and the 5GC/EPC 210. Generally, the MME/AMF/SMF 211 provides bearer and connection management. All user Internet Protocol (IP) packets are transmitted through the S-GW/UPF 212, the S-GW/UPF 212 is connected to the P-GW/UPF 213. The P-GW provides UE IP address allocation and other functions. The P-GW/UPF 213 is connected to the Internet Service 230. The Internet Service 230 comprises IP services corresponding to operators, specifically including Internet, Intranet, IP Multimedia Subsystem (IMS) and Packet Switching Streaming Services (PSS).

In one embodiment, the first node in the present application comprises the UE 201.

In one embodiment, the second node in the present application comprises the gNB 203.

In one embodiment, the UE in the present application comprises the UE 201.

In one embodiment, the base station in the present application comprises the gNB 203.

In one embodiment, a receiver of the first signaling in the present application comprises the UE 201.

In one embodiment, a transmitter of the first signaling in the present application comprises the gNB 203.

In one embodiment, a transmitter of the first signal in the present application comprises the UE 201.

In one embodiment, a receiver of the first signal in the present application comprises the gNB 203.

In one embodiment, a receiver of the second signal in the present application comprises the UE 201.

In one embodiment, a transmitter of the second signal in the present application comprises the gNB 203.

In one embodiment, a transmitter of the third signal in the present application comprises the UE 201.

In one embodiment, a receiver of the third signal in the present application comprises the gNB 203.

In one embodiment, a receiver of the fourth signal in the present application comprises the UE 201.

In one embodiment, a transmitter of the fourth signal in the present application comprises the gNB 203.

Embodiment 3

Figure 3:
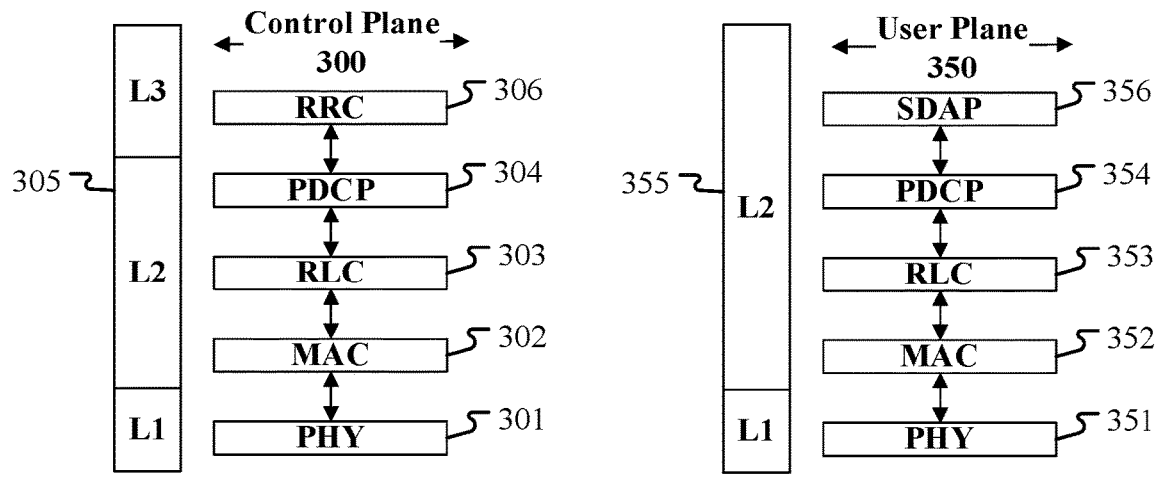
FIG. 3 illustrates a schematic diagram of a radio protocol architecture of a user plane and a control plane according to one embodiment of the present application.

Embodiment 3 illustrates a schematic diagram of an example of a radio protocol architecture of a user plane and a control plane according to one embodiment of the present application, as shown in FIG. 3. FIG. 3 is a schematic diagram illustrating an embodiment of a radio protocol architecture of a user plane 350 and a control plane 300. In FIG. 3, the radio protocol architecture for a control plane 300 between a first node (UE or RSU in V2X, vehicle equipment or On-Board Communication Unit) and a second node (gNB, UE or RSU in V2X, vehicle equipment or On-Board Communication Unit), or between two UEs is represented by three layers, which are respectively layer 1, layer 2 and layer 3. The layer 1 (L1) is the lowest layer and performs signal processing functions of various PHY layers. The L1 is called PHY 301 in the present application. The layer 2 (L2) 305 is above the PHY 301, and is in charge of the link between the first node and the second node, and between two UEs via the PHY 301. The L2 305 comprises a Medium Access Control (MAC) sublayer 302, a Radio Link Control (RLC) sublayer 303 and a Packet Data Convergence Protocol (PDCP) sublayer 304. All the three sublayers terminate at the second nodes. The PDCP sublayer 304 provides data encryption and integrity protection and provides support for handover of a first node between second nodes. The RLC sublayer 303 provides segmentation and reassembling of a packet, retransmission of a lost data packet through ARQ, as well as repeat data packet detection and protocol error detection. The MAC sublayer 302 provides mapping between a logic channel and a transport channel and multiplexing of the logical channel. The MAC sublayer 302 is also responsible for allocating between first nodes various radio resources (i.e., resource block) in a cell. The MAC sublayer 302 is also responsible for HARQ operations. In the control plane 300, the RRC sublayer 306 in the L3 layer is responsible for acquiring radio resources (i.e., radio bearer) and configuring the lower layer using an RRC signaling between the second node and the first node. The radio protocol architecture in the user plane 350 comprises the L1 layer and the L2 layer. In the user plane 350, the radio protocol architecture used for the first communication node and the second communication node in a PHY layer 351, a PDCP sublayer 354 of the L2 layer 355, an RLC sublayer 353 of the L2 layer 355 and a MAC sublayer 352 of the L2 layer 355 is almost the same as the radio protocol architecture used for corresponding layers and sublayers in the control plane 300, but the PDCP sublayer 354 also provides header compression used for higher-layer packet to reduce radio transmission overhead. The L2 layer 355 in the user plane 350 also includes Service Data Adaptation Protocol (SDAP) sublayer 356, which is responsible for the mapping between QoS flow and Data Radio Bearer (DRB) to support the diversity of traffic. Although not described in FIG. 3, the first node may comprise several higher layers above the L2 305, such as a network layer (i.e., IP layer) terminated at a P-GW of the network side and an application layer terminated at the other side of the connection (i.e., a peer UE, a server, etc.).

In one embodiment, the radio protocol architecture in FIG. 3 is applicable to the first node in the present application.

In one embodiment, the radio protocol architecture in FIG. 3 is applicable to the second node in the present application.

In one embodiment, the first signaling in the present application is generated by the RRC sublayer 306.

In one embodiment, the first signaling in the present application is generated by the PHY 301.

In one embodiment, the first signal in the present application is generated by the PHY 301.

In one embodiment, the second signal in the present application is generated by the MAC sublayer 302.

In one embodiment, the third signal in the present application is generated by the RRC sublayer 306.

In one embodiment, the third signal in the present application is generated by the SDAP sublayer 356.

In one embodiment, the third signal in the present application is transmitted to the PHY 301 via the MAC sublayer 302.

In one embodiment, the fourth signal in the present application is generated by the RRC sublayer 306.

In one embodiment, the fourth signal in the present application is generated by the SDAP sublayer 356.

In one embodiment, the fourth signal in the present application is transmitted to the PHY 301 via the MAC sublayer 302.

In one embodiment, the fourth signal in the present application is generated by the PHY 301.

Embodiment 4

Figure 4:
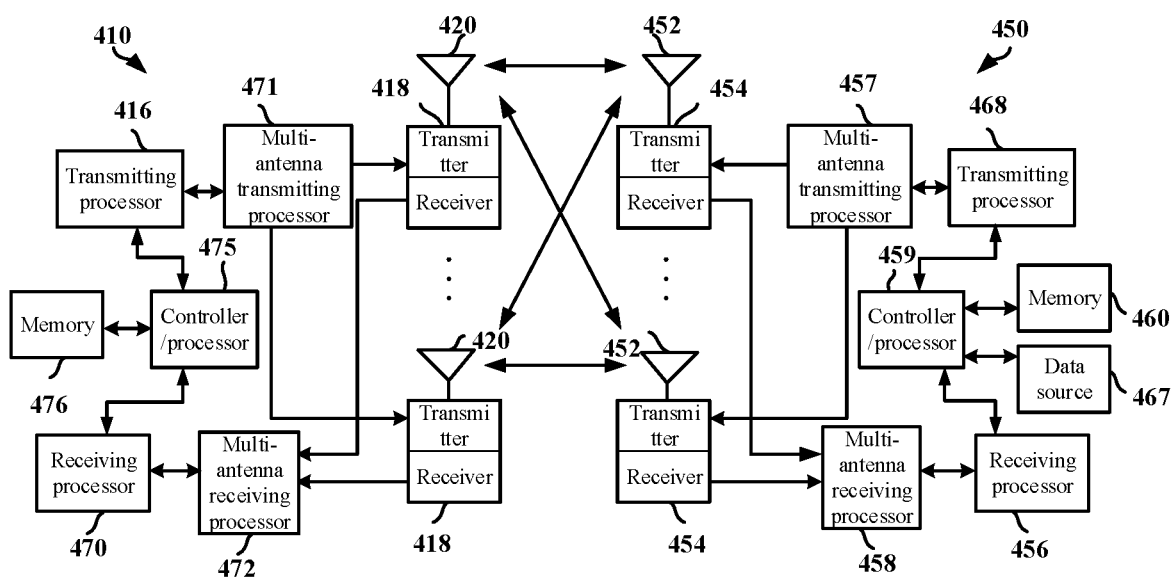
FIG. 4 illustrates a schematic diagram of a first communication device and a second communication device according to one embodiment of the present application.

Embodiment 4 illustrates a schematic diagram of a first communication device and a second communication device in the present application, as shown in FIG. 4. FIG. 4 is a block diagram of a first communication device 410 in communication with a second communication device 450 in an access network.

The first communication device 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

The second communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

In a transmission from the first communication device 410 to the second communication device 450, at the first communication device 410, a higher layer packet from the core network is provided to a controller/processor 475. The controller/processor 475 provides a function of the L2 layer. In the transmission from the first communication device 410 to the first communication device 450, the controller/processor 475 provides header compression, encryption, packet segmentation and reordering, and multiplexing between a logical channel and a transport channel, and radio resources allocation to the second communication device 450 based on various priorities. The controller/processor 475 is also responsible for retransmission of a lost packet and a signaling to the second communication device 450. The transmitting processor 416 and the multi-antenna transmitting processor 471 perform various signal processing functions used for the L1 layer (that is, PHY). The transmitting processor 416 performs coding and interleaving so as to ensure an FEC (Forward Error Correction) at the second communication device 450, and the mapping to signal clusters corresponding to each modulation scheme (i.e., BPSK, QPSK, M-PSK, M-QAM, etc.). The multi-antenna transmitting processor 471 performs digital spatial precoding, including codebook-based precoding and non-codebook-based precoding, and beamforming on encoded and modulated symbols to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multicarrier symbol streams. After that the multi-antenna transmitting processor 471 performs transmission analog precoding/beamforming on the time-domain multicarrier symbol streams. Each transmitter 418 converts a baseband multicarrier symbol stream provided by the multi-antenna transmitting processor 471 into a radio frequency (RF) stream. Each radio frequency stream is later provided to different antennas 420.

In a transmission from the first communication device 410 to the second communication device 450, at the second communication device 450, each receiver 454 receives a signal via a corresponding antenna 452. Each receiver 454 recovers information modulated to the RF carrier, converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs receiving analog precoding/beamforming on a baseband multicarrier symbol stream from the receiver 454. The receiving processor 456 converts the baseband multicarrier symbol stream after receiving the analog precoding/beamforming from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any the second communication device-targeted spatial stream. Symbols on each spatial stream are demodulated and recovered in the receiving processor 456 to generate a soft decision. Then the receiving processor 456 decodes and de-interleaves the soft decision to recover the higher-layer data and control signal transmitted on the physical channel by the first communication node 410. Next, the higher-layer data and control signal are provided to the controller/processor 459. The controller/processor 459 performs functions of the L2 layer. The controller/processor 459 can be connected to a memory 460 that stores program code and data. The memory 460 can be called a computer readable medium. In the transmission from the first communication device 410 to the second communication device 450, the controller/processor 459 provides demultiplexing between a transport channel and a logical channel, packet reassembling, decryption, header decompression and control signal processing so as to recover a higher-layer packet from the core network. The higher-layer packet is later provided to all protocol layers above the L2 layer, or various control signals can be provided to the L3 layer for processing.

In a transmission from the second communication device 450 to the first communication device 410, at the second communication device 450, the data source 467 is configured to provide a higher-layer packet to the controller/processor 459. The data source 467 represents all protocol layers above the L2 layer. Similar to a transmitting function of the first communication device 410 described in the transmission from the first communication device 410 to the second communication device 450, the controller/processor 459 performs header compression, encryption, packet segmentation and reordering, and multiplexing between a logical channel and a transport channel based on radio resources allocation so as to provide the L2 layer functions used for the user plane and the control plane. The controller/processor 459 is also responsible for retransmission of a lost packet, and a signaling to the first communication device 410. The transmitting processor 468 performs modulation mapping and channel coding. The multi-antenna transmitting processor 457 implements digital multi-antenna spatial precoding, including codebook-based precoding and non-codebook-based precoding, as well as beamforming. Following that, the generated spatial streams are modulated into multicarrier/single-carrier symbol streams by the transmitting processor 468, and then modulated symbol streams are subjected to analog precoding/beamforming in the multi-antenna transmitting processor 457 and provided from the transmitters 454 to each antenna 452. Each transmitter 454 first converts a baseband symbol stream provided by the multi-antenna transmitting processor 457 into a radio frequency symbol stream, and then provides the radio frequency symbol stream to the antenna 452.

In the transmission from the second communication device 450 to the first communication device 410, the function of the first communication device 410 is similar to the receiving function of the second communication device 450 described in the transmission from the first communication device 410 to the second communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and multi-antenna receiving processor 472 collectively provide functions of the L1 layer. The controller/processor 475 provides functions of the L2 layer. The controller/processor 475 can be connected with the memory 476 that stores program code and data. The memory 476 can be called a computer readable medium. In the transmission from the second communication device 450 to the first communication device 410, the controller/processor 475 provides de-multiplexing between a transport channel and a logical channel, packet reassembling, decryption, header decompression, control signal processing so as to recover a higher-layer packet from the UE 450. The higher-layer packet coming from the controller/processor 475 may be provided to the core network.

In one embodiment, the first node in the present application comprises the second communication device 450, and the second node in the present application comprises the first communication device 410.

In one subembodiment of the above embodiment, the first node is a UE, and the second node is a UE.

In one subembodiment of the above embodiment, the first node is a UE, and the second node is a relay node.

In one subembodiment of the above embodiment, the first node is a relay node, and the second node is a UE.

In one subembodiment of the above embodiment, the second communication device 450 comprises: at least one controller/processor; the at least one controller/processor is responsible for HARQ operation.

In one subembodiment of the above embodiment, the first communication device 410 comprises: at least one controller/processor; the at least one controller/processor is responsible for HARQ operation.

In one subembodiment of the above embodiment, the first communication device 410 comprises: at least one controller/processor; the at least one controller/processor is responsible for error detection using ACK and/or NACK protocols as a way to support HARQ operation.

In one embodiment, the second communication device 450 comprises at least one processor and at least one memory. The at least one memory comprises computer program codes; the at least one memory and the computer program codes are configured to be used in collaboration with the at least one processor. The second communication device 450 at least: transmits a first signal, the first signal carries a first signature sequence; receives a second signal, the second signal carries a first identifier, the first signature sequence is used to indicate the first identifier; and transmits a third signal on a target time-frequency resource block; the second signal is used to indicate a first time-frequency resource block, the first time-frequency resource block is used to determine a target time-frequency resource set, the target time-frequency resource set comprises multiple time-frequency resource blocks, and the first time-frequency resource block is one of the multiple time-frequency resource blocks comprised in the target time-frequency resource set; the target time-frequency resource block is one of the multiple time-frequency resource blocks comprised in the target time-frequency resource set, and whether the third signal carries a first-type information block is used to determine the target time-frequency resource block out of the target time-frequency resource set; the first-type information block comprises C-Plane information.

In one embodiment, the second communication device 450 comprises a memory that stores a computer readable instruction program. The computer readable instruction program generates an action when executed by at least one processor. The action includes: transmitting a first signal, the first signal carrying a first signature sequence; receiving a second signal, the second signal carrying a first identifier, the first signature sequence being used to indicate the first identifier; and transmitting a third signal on a target time-frequency resource block; the second signal is used to indicate a first time-frequency resource block, the first time-frequency resource block is used to determine a target time-frequency resource set, the target time-frequency resource set comprises multiple time-frequency resource blocks, and the first time-frequency resource block is one of the multiple time-frequency resource blocks comprised in the target time-frequency resource set; the target time-frequency resource block is one of the multiple time-frequency resource blocks comprised in the target time-frequency resource set, and whether the third signal carries a first-type information block is used to determine the target time-frequency resource block out of the target time-frequency resource set; the first-type information block comprises C-Plane information.

In one embodiment, the first communication device 410 comprises at least one processor and at least one memory. The at least one memory comprises computer program codes; the at least one memory and the computer program codes are configured to be used in collaboration with the at least one processor. The first communication device 410 at least: transmits a second signal, the second signal carries a first identifier, the first signature sequence indicates the first identifier; and receives a third signal on a target time-frequency resource block; the second signal indicates a first time-frequency resource block, the first time-frequency resource block is used to determine a target time-frequency resource set, the target time-frequency resource set comprises multiple time-frequency resource blocks, and the first time-frequency resource block is one of the multiple time-frequency resource blocks comprised in the target time-frequency resource set; the target time-frequency resource block is one of the multiple time-frequency resource blocks comprised in the target time-frequency resource set, and whether the third signal carries a first-type information block is used to determine the target time-frequency resource block out of the target time-frequency resource set; the first-type information block comprises C-Plane information.

In one embodiment, the first communication device 410 comprises a memory that stores a computer readable instruction program. The computer readable instruction program generates an action when executed by at least one processor. The action includes: transmitting a second signal, the second signal carrying a first identifier, the first signature sequence indicating the first identifier; and receiving a third signal on a target time-frequency resource block; the second signal indicates a first time-frequency resource block, the first time-frequency resource block is used to determine a target time-frequency resource set, the target time-frequency resource set comprises multiple time-frequency resource blocks, and the first time-frequency resource block is one of the multiple time-frequency resource blocks comprised in the target time-frequency resource set; the target time-frequency resource block is one of the multiple time-frequency resource blocks comprised in the target time-frequency resource set, and whether the third signal carries a first-type information block is used to determine the target time-frequency resource block out of the target time-frequency resource set; the first-type information block comprises C-Plane information.

In one embodiment, at least one of the antenna 452, the receiver 454, the multi-antenna receiving processor 458, the receiving processor 456, the controller/processor 459, the memory 460, or the data source 467 is used to receive a first signaling in the present application.

In one embodiment, at least one of the antenna 452, the transmitter 454, the multi-antenna transmitting processor 458, the transmitting processor 468, the controller/processor 459, the memory 460, or the data sources 467 is used to transmit a first signal in the present application.

In one embodiment, at least one of the antenna 452, the receiver 454, the multi-antenna receiving processor 458, the receiving processor 456, the controller/processor 459, the memory 460, or the data source 467 is used to receive a second signal in the present application.

In one embodiment, at least one of the antenna 452, the transmitter 454, the multi-antenna transmission processor 458, the transmitting processor 468, the controller/processor 459, the memory 460, or the data source 467 is used to transmit a third signal on a target time-frequency resource block in the present application.

In one embodiment, at least one of the antenna 452, the receiver 454, the multi-antenna receiving processor 458, the receiving processor 456, the controller/processor 459, the memory 460, or the data source 467 is used to receive a fourth signal in the present application.

In one embodiment, at least one of the antenna 420, the transmitter 418, the multi-antenna transmitting processor 471, the transmitting processor 416, the controller/processor 475, or the memory 476 is used to transmit a first signaling in the present application.

In one embodiment, at least one of the antenna 420, the receiver 418, the multi-antenna receiving processor 472, the receiving processor 470, the controller/processor 475, or the memory 476 is used to receive a first signal in the present application.

In one embodiment, at least one of the antenna 420, the transmitter 418, the multi-antenna transmitting processor 471, the transmitting processor 416, the controller/processor 475, or the memory 476 is used to transmit a second signal in the present application.

In one embodiment, at least one of the antenna 420, the receiver 418, the multi-antenna receiving processor 472, the receiving processor 470, the controller/processor 475, or the memory 476 is used to receive a third signal on a target time-frequency resource block in the present application.

In one embodiment, at least one of the antenna 420, the transmitter 418, the multi-antenna transmitting processor 471, the transmitting processor 416, the controller/processor 475, or the memory 476 is used to transmit a fourth signal in the present application.

Embodiment 5

Figure 5:
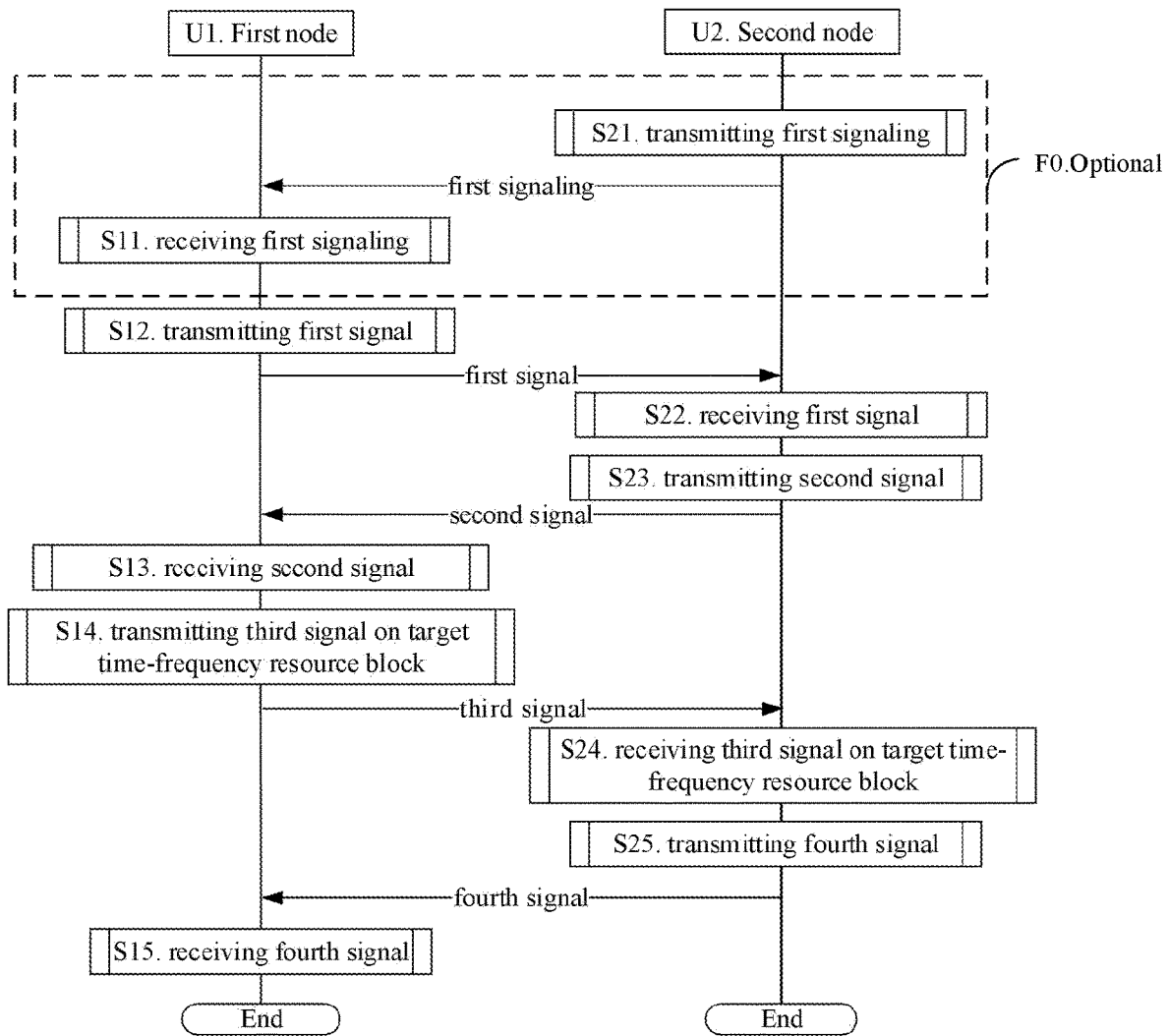
FIG. 5 illustrates a flowchart of radio signal transmission according to one embodiment of the present application.

Embodiment 5 illustrates a flowchart of radio signal transmission according to one embodiment in the present application, as shown in FIG. 5. In FIG. 5, a first node U1 and a second node U2 are in communications via an air interface, and steps in block F0 in FIG. 5 are optional.

The first node U1 receives a first signaling in step S11; transmits a first signal in step S12; receives a second signal in step S13; transmits a third signal on a target time-frequency resource block in step S14; and receives a fourth signal in step S15.

The second node U2 transmits a first signaling in step S21; receives a first signal in step S22; transmits a second signal in step S23; receives a third signal on a target time-frequency resource block in step S14; and transmits a fourth signal in step S25.

In embodiment 5, the first signal carries a first signature sequence; the first signal is transmitted on a random access channel; the second signal carries a first identifier, the first signature sequence is used by the first node U1 to indicate the first identifier; and the second signal is used by the second node U2 to indicate a first time-frequency resource block, the first time-frequency resource block is used by the first node U1 to determine a target time-frequency resource set, the target time-frequency resource set comprises multiple time-frequency resource blocks, and the first time-frequency resource block is one of the multiple time-frequency resource blocks comprised in the target time-frequency resource set; the target time-frequency resource block is one of the multiple time-frequency resource blocks comprised in the target time-frequency resource set, and whether the third signal carries a first-type information block is used by the first node U1 to determine the target time-frequency resource block out of the target time-frequency resource set; the first-type information block comprises C-Plane information; the third signal comprises a first identity; both the first identity and the target time-frequency resource block is used to determine the fourth signal.

In one embodiment, the first-type information block comprises at least one of RRC Setup Request, RRC Resume Request, RRC Resume Request1, RRC Reestablishment Request, RRC Reconfiguration Complete, RRC Handover Confirm or RRC Early Data Request.

In one embodiment, the target time-frequency resource set comprises a positive integer number of first-type time-frequency resource block(s) and a positive integer number of second-type time-frequency resource block(s); when the third signal carries the first-type information block, the target time-frequency resource block is one of the positive integer number of first-type time-frequency resource block(s) comprised in the target time-frequency resource set; when the third signal does not carry the first-type information block, the target time-frequency resource block is one of the positive integer number of second-type time-frequency resource block(s) comprised in the target time-frequency resource set.

In one embodiment, a first bit block is used by the first node U1 to generate the third signal; when the third signal does not carry the first-type information block, a size of the first bit block is used by the first node U1 to determine the target time-frequency resource block out of the target time-frequency resource set.

In one embodiment, a first bit block is used by the first node U1 to generate the third signal; when the third signal carries the first-type information block, a size of the first bit block is used by the first node U1 to determine the target time-frequency resource block out of the target time-frequency resource set.

In one embodiment, the target time-frequency resource set comprises a positive integer number of first-type time-frequency resource block(s) and a positive integer number of second-type time-frequency resource block(s); the second signal indicates the first time-frequency resource block; the first time-frequency resource block is used by the first node U1 to determine the positive integer number of first-type time-frequency resource block(s) comprised in the target time-frequency resource set; the first signaling indicates the positive integer number of second-type time-frequency resource block(s) comprised in the target time-frequency resource set; a first bit block is used by the first node U1 to generate the third signal; when the third signal does not carry the first-type information block, a size of the first bit block is used by the first node U1 to determine the target time-frequency resource block out of the positive integer number of second-type time-frequency resource block(s).

In one embodiment, the target time-frequency resource set comprises a positive integer number of first-type time-frequency resource block(s) and a positive integer number of second-type time-frequency resource block(s); a first bit block is used by the first node U1 to generate the third signal; when the third signal carries the first-type information block, the target time-frequency resource block is one of the positive integer number of first-type time-frequency resource block(s) comprised in the target time-frequency resource set; when the third signal does not carry the first-type information block, the size of the first bit block is greater than a first threshold, the target time-frequency resource block is one of the positive integer number of first-type time-frequency resource block(s) comprised in the target time-frequency resource set; when the third signal does not carry the first-type information block and the size of the first bit block is less than a first threshold, the target time-frequency resource block is one of the positive integer number of second-type time-frequency resource block(s) comprised in the target time-frequency resource set.

In one embodiment, when the first time-frequency resource block is used by the first node U1 to determine the positive integer number of second-type time-frequency resource block(s) comprised in the target time-frequency resource set, the step in block F0 in FIG. 5 does not exist.

In one embodiment, when the first time-frequency resource block is used by the first node U1 to determine the target time-frequency resource set and the target time-frequency resource set comprises the positive integer number of first-type time-frequency resource block(s) and the positive integer number of second-type time-frequency resource block(s), the step in block F0 in FIG. 5 does not exist.

In one embodiment, the fourth signal comprises a baseband signal.

In one embodiment, the fourth signal comprises a radio-frequency signal.

In one embodiment, the fourth signal comprises a radio signal.

In one embodiment, the fourth signal is transmitted on a DL-SCH.

In one embodiment, the fourth signal is transmitted on a PDSCH.

In one embodiment, the fourth signal is transmitted on a PDCCH.

In one embodiment, the fourth signal is transmitted on a PDCCH and a PDSCH.

In one embodiment, the first signal is transmitted on a PRACH, the second signal is respectively transmitted on a PDCCH and a PDSCH, the third signal is transmitted a PUSCH, and the fourth signal is transmitted on a PDCCH.

In one embodiment, the first signal is transmitted on a PRACH, the second signal is respectively transmitted on a PDCCH and a PDSCH, the third signal is transmitted on a PUSCH, and the fourth signal is transmitted on a PDSCH.

In one embodiment, the first signal is transmitted on a PRACH, the second signal is respectively transmitted on a PDCCH and a PDSCH, the third signal is transmitted on a PUSCH, and the fourth signal is transmitted on a PDCCH and a PDSCH.

In one embodiment, the fourth signal is cell-specific.

In one embodiment, the fourth signal is UE-specific.

In one embodiment, the fourth signal is broadcast.

In one embodiment, the fourth signal is groupcast.

In one embodiment, the fourth signal is unicast.

In one embodiment, the fourth signal comprises one or more fields in a MAC CE.

In one embodiment, the fourth signal comprises a UE Contention Resolution Identity.

In one embodiment, the fourth signal comprises a UE Contention Resolution Identity MAC CE.

In one embodiment, the fourth signal is Msg4 in a random access procedure.

In one embodiment, the fourth signal is Msg4 of Type-1 Random Access Procedure.

In one embodiment, the fourth signal comprises Hybrid Automatic Repeat Request (HARQ) information.

In one embodiment, the fourth signal is used to indicate whether the first bit block is correctly received.

In one embodiment, the fourth signal is used to indicate whether the first bit block set is correctly received.

In one embodiment, the fourth signal comprises a first information bit, and the first information bit is used to indicate whether the first bit block is correctly received.

In one subembodiment of the above embodiment, when the first information bit is "1", it represents that the first bit block is correctly received.

In one subembodiment of the above embodiment, when the first information bit is "0", it represents that the first bit block is not correctly received.

In one embodiment, the fourth signal comprises a positive integer number of information bit(s), and the positive integer number of information bit(s) comprised in the fourth signal is (are respectively) used to indicate whether the positive integer number of first-type bit block(s) comprised in the first bit block set is(are) correctly received.

In one subembodiment of the above embodiment, a second information bit is any of the positive integer number of information bit(s) comprised in the fourth signal, a second bit block is a first-type bit block corresponding to the second information bit among the positive integer number of first-type bit block(s) comprised in the first bit block set, and the second information block is used to indicate whether the second bit block is correctly received.

In one subembodiment of the above embodiment, when the second information bit is "1", it represents that the second bit block is correctly received.

In one subembodiment of the above embodiment, when the second information bit is "0", it represents that the second bit block is not correctly received.

In one embodiment, the first signal comprises a random access preamble, the second signal comprises an RAR, the third signal comprises RRC connection related information, and the fourth signal comprises a contention resolution message.

In one embodiment, the first signal comprises a random access preamble, the second signal comprises an RAR, the third signal comprises small data, and the fourth signal comprises HARQ information.

In one embodiment, the first signal comprises a random access preamble, the second signal comprises an RAR, the third signal comprises C-Plane information, and the fourth signal comprises a contention resolution message.

In one embodiment, the first signal comprises a random access preamble, the second signal comprises an RAR, the third signal comprises U-Plane information, and the fourth signal comprises HARQ information.

In one embodiment, the first signal comprises a random access preamble, the second signal comprises an RAR, the third signal comprises an RRC message, and the fourth signal comprises a contention resolution message.

In one embodiment, the first signal comprises a random access preamble, the second signal comprises an RAR, the third signal comprises SDAP data, and the fourth signal comprises HARQ information.

In one embodiment, the first signal comprises a random access preamble, the second signal comprises an RAR, the third signal comprises a NAS message, and the fourth signal comprises HARQ information.

In one embodiment, the first signal is Msg1 in a random access procedure, the second signal is Msg2 in a random access procedure, the third signal is Msg3 in a random access procedure, and the fourth signal is Msg4 in a random access procedure.

In one embodiment, the first signal is Msg1 of Type-1 Random Access Procedure, and the second signal is Msg2 of Type-1 Random Access Procedure, the third signal is Msg3 of Type-1 Random Access Procedure, and the fourth signal is Msg4 of Type-1 Random Access Procedure.

In one embodiment, the first signal comprises a random access preamble, the second signal comprises an RAR, the third signal comprises small data, and the fourth signal is used to indicate whether the first bit block comprised in the third signal is correctly received.

In one embodiment, the first signal comprises a random access preamble, the second signal comprises an RAR, the third signal comprises small data, and the fourth signal is used to indicate whether the first bit block set comprised in the third signal is correctly received.

In one embodiment, the first signal comprises a random access preamble, the second signal comprises an RAR, the third signal comprises U-Plane information, and the fourth signal comprises HARQ information.

In one embodiment, the first signal comprises a random access preamble, the second signal comprises an RAR, the third signal comprises U-Plane information, and the fourth signal is used to indicate whether the first bit block comprised in the third signal is correctly received.

In one embodiment, the first signal comprises a random access preamble, the second signal comprises an RAR, the third signal comprises U-Plane information, and the fourth signal is used to indicate whether the first bit block set comprised in the third signal is correctly received.

In one embodiment, the first signal comprises a random access preamble, the second signal comprises an RAR, the third signal comprises SDAP data, and the fourth signal comprises HARQ information.

In one embodiment, the first signal comprises a random access preamble, the second signal comprises an RAR, the third signal comprises SDAP data, and the fourth signal is used to indicate whether the first bit block comprised in the third signal is correctly received.

In one embodiment, the first signal comprises a random access preamble, the second signal comprises an RAR, the third signal comprises SDAP data, and the fourth signal is used to indicate whether the first bit block set comprised in the third signal is correctly received.

In one embodiment, the first signal comprises a random access preamble, the second signal comprises an RAR, the third signal comprises a NAS message, and the fourth signal comprises HARQ information.

In one embodiment, the first signal comprises a random access preamble, the second signal comprises an RAR, the third signal comprises a NAS message.

In one embodiment, the first signal comprises a random access preamble, the second signal comprises an RAR, the third signal comprises a NAS message, and the fourth signal comprises HARQ information.

In one embodiment, the first signal comprises a random access preamble, the second signal comprises an RAR, the third signal comprises a NAS message, and the fourth signal is used to indicate whether the first bit block set comprised in the third signal is correctly received.

In one embodiment, the third signal comprises the first identity.

In one embodiment, the third signal carries the first identity.

In one embodiment, the third signal directly carries the first identity.

In one embodiment, the third signal indirectly carries the first identity.

In one embodiment, the third signal comprises a positive integer number of third-type field(s), the first identity is one of the positive integer number of third-type field(s) comprised in the third signal, and the RRC connection related information is one of the positive integer number of third-type field(s) comprised in the third signal.

In one embodiment, the third signal comprises a positive integer number of third-type field(s), the first identity is one of the positive integer number of third-type field(s) comprised in the third signal, and the SDAP data is one of the positive integer number of third-type field(s) comprised in the third signal.

In one embodiment, the third signal comprises a positive integer number of third-type field(s), the first identity is one of the positive integer number of third-type field(s) comprised in the third signal, and the NAS message is one of the third-type field comprised in the third signal.

In one embodiment, the first identity is used to generate a scrambling sequence of the third signal.

In one embodiment, the first identity is used to generate an initial value of a scrambling sequence of the third signal.

In one embodiment, the first identity comprises a Cell-Radio Network Temporary Identifier (C-RNTI).

In one embodiment, the first identity comprises a TC-RNTI.

In one embodiment, the first identity comprises a Serving-Temporary Mobile Subscriber Identity (S-TMSI).

In one embodiment, the first identity comprises a random number.

Embodiment 6

Figure 6:
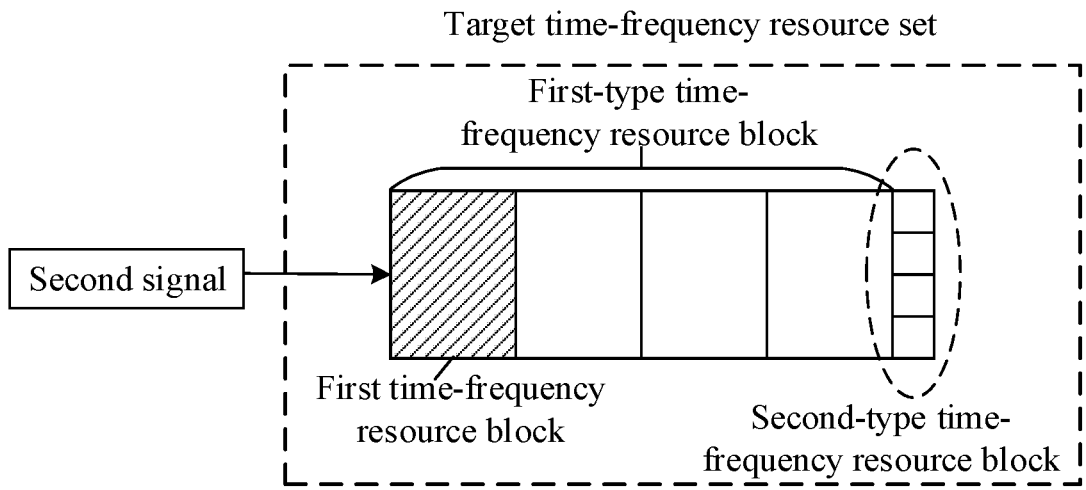
FIG. 6 illustrate a schematic diagram of relations among a second signal, a first time-frequency resource block and a target time-frequency resource set according to one embodiment of the present application.

Embodiment 6 illustrate a schematic diagram of relations among a second signal, a first time-frequency resource block and a target time-frequency resource set according to one embodiment of the present application, as shown in FIG. 6. In FIG. 6, the dotted box represents a target time-frequency resource set in the present application; the rectangle represents a first-type time-frequency resource block in the target time-frequency resource set in the present application; the square in the dotted ellipse represents a second-type time-frequency resource block in the target time-frequency resource set in the present application; the slash-filled rectangle represents the first time-frequency resource block in the present application.

In embodiment 6, the second signal is used to indicate a first time-frequency resource block; the first time-frequency resource block is used to determine a target time-frequency resource set; the target time-frequency resource set comprises a positive integer number of first-type time-frequency resource block(s) and a positive integer number of second-type time-frequency resource block(s).

In one embodiment, the first time-frequency resource block comprises a PUSCH.

In one embodiment, the first time-frequency resource block belongs to a PUSCH occasion.

In one embodiment, the first time-frequency resource block comprises a positive integer number of time-domain resource unit(s).

In one embodiment, the first time-frequency resource block comprises a positive integer number of frequency-domain resource unit(s).

In one embodiment, the first time-frequency resource block comprises a positive integer number of time-frequency resource unit(s).

In one embodiment, the first time-frequency resource comprises multiple REs.

In one embodiment, the positive integer number of frequency-domain resource unit(s) comprised in the first time-frequency resource is(are) consecutive in frequency domain.

In one embodiment, the first time-frequency resource comprises a positive integer number of PRB(s).

In one embodiment, the first time-frequency resource comprises a positive integer number of consecutive PRB(s).

In one embodiment, the first time-frequency resource comprises a positive integer number of subcarrier(s).

In one embodiment, the first time-frequency resource comprises a positive integer number of sub-frame(s).

In one embodiment, the first time-frequency resource comprises a positive integer number of slot(s).

In one embodiment, the first time-frequency resource comprises a positive integer number of symbol(s).

In one embodiment, the first time-frequency resource belongs to a slot, and the slot comprises a positive integer number of multicarrier symbol(s).

In one subembodiment of the above embodiment, the slot comprises 14 multicarrier symbols.

In one embodiment, the first time-frequency resource comprises a positive integer number of consecutive multi-carrier symbol(s).

In one embodiment, the second signal directly indicates the first time-frequency resource block.

In one embodiment, the second signal indirectly indicates the first time-frequency resource block.

In one embodiment, the first time-frequency resource block is one of the positive integer number of first-type time-frequency resource block(s) comprised in the target time-frequency resource set.

In one embodiment, the second signal comprises a MAC RAR, and the first time-frequency resource block is a field in the MAC RAR.

In one embodiment, the second signal comprises a MAC RAR, and the MAC RAR indicates the first time-frequency resource block.

In one embodiment, the second signal comprises a MAC RAR, the MAC RAR comprises a UL Grant field, and the UL Grant field indicates the first time-frequency resource block.

In one subembodiment of the above embodiment, the UL Grant field comprises 27 bits.

In one embodiment, the second signal indicates time-domain resources and frequency-domain resources of the first time-frequency resource block.

In one embodiment, the second signal comprises a start time and a time span of the first time-frequency resource block.

In one embodiment, the second signal comprises a lowest subcarrier of the first time-frequency resource block and a number of subcarrier(s) occupied by the first time-frequency resource block.

In one embodiment, the second signal is used to indicate the first time-frequency resource block out of a positive integer number of time-frequency resource block(s).

In one embodiment, the second signal comprises an index of the first time-frequency resource block in the positive integer number of time-frequency resource block(s).

In one embodiment, the target time-frequency resource set comprises multiple time-frequency resource blocks, and the first time-frequency resource block is one of the multiple time-frequency resource blocks comprised in the target time-frequency resource set.

In one embodiment, any of the multiple time-frequency resource blocks comprised in the target time-frequency resource set comprises a PUSCH.

In one embodiment, any of the multiple time-frequency resource blocks comprised in the target time-frequency resource set belongs to a PUSCH occasion.

In one embodiment, the target time-frequency resource set comprises a positive integer number of first-type time-frequency resource block(s) and a positive integer number of second-type time-frequency resource block(s).

In one subembodiment of the above embodiment, the positive integer number of first-type time-frequency resource block(s) belongs(belong) to the multiple time-frequency resource blocks comprised in the time-frequency resource set.

In one subembodiment of the above embodiment, the positive integer number of second-type time-frequency resource block(s) belongs(belong) to the multiple time-frequency resource blocks comprised in the time-frequency resource set.

In one embodiment, the target time-frequency resource set comprises one first-type time-frequency resource block and one second-type time-frequency resource block.

In one embodiment, the target time-frequency resource set comprises a positive integer number of first-type time-frequency resource block(s) and a positive integer number of second-type time-frequency resource block(s), and the first time-frequency resource block is one of the positive integer number of first-type time-frequency resource block(s) comprised in the target time-frequency resource set.

In one embodiment, the target time-frequency resource set comprises a positive integer number of first-type time-frequency resource block(s) and a positive integer number of second-type time-frequency resource block(s), and the first time-frequency resource block is one of the positive integer number of second-type time-frequency resource block(s) comprised in the target time-frequency resource set.

In one embodiment, the target time-frequency resource set comprises a positive integer number of first-type time-frequency resource block(s) and a positive integer number of second-type time-frequency resource block(s), and the first time-frequency resource block is an earliest first-type time-frequency resource block among the positive integer number of first-type time-frequency resource block(s) comprised in the target time-frequency resource set.

In one embodiment, the target time-frequency resource set comprises one first-type time-frequency resource block and a positive integer number of second-type time-frequency resource block(s), and the first time-frequency resource block is the first-type time-frequency resource block comprised in the target time-frequency resource set.

In one embodiment, the target time-frequency resource set comprises the first time-frequency resource block and the positive integer number of second-type time-frequency resource block(s).

In one embodiment, the target time-frequency resource set comprises the first-type time-frequency resource block and one second-type time-frequency resource block.

In one embodiment, the positive integer number of first-type time-frequency resource block(s) comprised in the target time-frequency resource set is(are) equally spaced in time.

In one embodiment, the positive integer number of first-type time-frequency resource block(s) comprised in the target time-frequency resource set is(are) equally spaced in frequency domain.

In one embodiment, the positive integer number of second-type time-frequency resource block(s) comprised in the target time-frequency resource set is(are) equally spaced in time.

In one embodiment, the positive integer number of second-type time-frequency resource block(s) comprised in the target time-frequency resource set is(are) equally spaced in frequency domain.

In one embodiment, each of the positive integer number of second-type time-frequency resource block(s) comprised the target time-frequency resource set and the first time-frequency resource block are spaced by a first time offset.

In one subembodiment of the above embodiment, the first time offset comprises a positive integer number of time-domain resource unit(s).

In one subembodiment of the above embodiment, the first time offset comprises a positive integer number of slot(s).

In one subembodiment of the above embodiment, the first time offset comprises a positive integer number of multi-carrier symbol(s).

In one embodiment, each of the positive integer number of second-type time-frequency resource block(s) comprised in the target time-frequency resource set is different from the first time-frequency resource block by a positive integer number of time offset(s).

In one subembodiment of the above embodiment, any of the positive integer number of time offset(s) comprises a positive integer number of time-domain resource unit(s).

In one subembodiment of the above embodiment, any of the positive integer number of time offset(s) comprises a positive integer number of slot(s).

In one subembodiment of the above embodiment, any of the positive integer number of time offset(s) comprises a positive integer number of multicarrier symbol(s).

In one embodiment, each of the positive integer number of second-type time-frequency resource block(s) comprised the target time-frequency resource set is different from the first time-frequency resource block by a first frequency offset.

In one subembodiment of the above embodiment, the first frequency offset comprises a positive integer number of frequency-domain resource unit(s).

In one subembodiment of the above embodiment, the first frequency offset comprises a positive integer number of PRB(s).

In one subembodiment of the above embodiment, the first frequency offset comprises a positive integer number of subcarrier(s).

In one embodiment, the positive integer number of second-type time-frequency resource block(s) comprised in the target time-frequency resource set is (are respectively) different from the first time-frequency resource block by a positive integer number of frequency offset(s).

In one subembodiment of the above embodiment, any of the positive integer number of frequency offset(s) comprises a positive integer number of frequency-domain resource unit(s).

In one subembodiment of the above embodiment, any of the positive integer number of frequency offset(s) comprises a positive integer number of PRB(s).

In one subembodiment of the above embodiment, any of the positive integer number of frequency offset(s) comprises a positive integer number of subcarrier(s).

In one embodiment, any of the positive integer number of first-type time-frequency resource block(s) comprised in the target time-frequency resource set comprises X1 time-domain resource unit(s), and any of the positive integer number of second-type time-frequency resource block(s) comprised in the target time-frequency resource set comprises X2 time-domain resource unit(s), X1 being a positive integer not less than X2.

In one embodiment, any of the positive integer number of first-type time-frequency resource block(s) comprised in the target time-frequency resource set comprises Y1 frequency-domain resource unit(s), and any of the positive integer number of second-type time-frequency resource block(s) comprised in the target time-frequency resource set comprises Y2 frequency-domain resource unit(s), Y1 being a positive integer not less than Y2.

In one embodiment, any of the positive integer number of first-type time-frequency resource block(s) comprised in the target time-frequency resource set comprises Z1 time-frequency resource unit(s), and any of the positive integer number of second-type time-frequency resource block(s) comprised in the target time-frequency resource set comprises Z2 time-frequency resource unit(s), Z1 being a positive integer not less than Z2.

In one embodiment, Z1 is equal to Z2.

In one embodiment, Z1 is greater than Z2.

In one embodiment, any of the positive integer number of first-type time-frequency resource block(s) comprised in the target time-frequency resource set comprises Z3 RE(s), and any of the positive integer number of second-type time-frequency resource block(s) comprised in the target time-frequency resource set comprises Z4 RE(s), Z3 being a positive integer not less than Z4.

In one embodiment, Z3 is equal to Z4.

In one embodiment, Z3 is greater than Z4.

Embodiment 7

Figure 7:
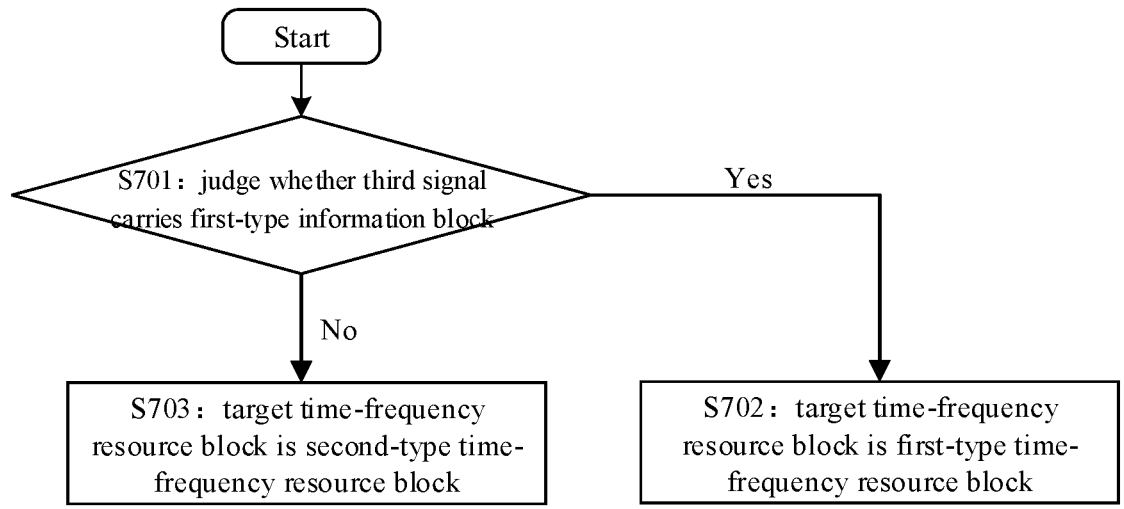
FIG. 7 illustrates a schematic diagram of a relation between a third signal and a first-type information block according to one embodiment of the present application.

Embodiment 7 illustrates a schematic diagram of a relation between a third signal and a first-type information block according to one embodiment of the present application, as shown in FIG. 7. In embodiment 7, in step S701, judge whether a third signal carries a first-type information block; when a result of judging whether a third signal carries a first-type information block is "yes", execute step S702, a target time-frequency resource block is a first-type time-frequency resource block; and when a result of judging whether a third signal carries a first-type information block is "no", execute step S703, a target time-frequency resource block is a first-type time-frequency resource block.

In one embodiment, the third signal carries the first-type information block.

In one embodiment, the third signal carries the first-type information block and the second-type information block.

In one embodiment, the third signal carries the second-type information block.

In one embodiment, the third signal carries the second-type information block, and the third signal does not carry the first-type information block.

In one embodiment, the third signal comprises a positive integer number of third-type field(s), and the first-type information block is one of the positive integer number of third-type field(s) comprised in the third signal.

In one embodiment, the third signal comprises a positive integer number of third-type field(s), and the second-type information block is one of the positive integer number of third-type field(s) comprised in the third signal.

In one embodiment, the third signal comprises a positive integer number of third-type field(s), the first-type information block is one of the positive integer number of third-type field(s) comprised in the third signal, and the second-type information block is one of the positive integer number of third-type field(s) comprised in the third signal.

In one embodiment, the third signal comprises a positive integer number of third-type field(s), the second-type information block is one of the positive integer number of third-type field(s) comprised in the third signal, and the first-type information block is not any of the positive integer number of third-type field(s) comprised in the third signal.

In one embodiment, the first-type information block is generated by an RRC layer.

In one embodiment, the first-type information block comprises C-Plane information.

In one embodiment, the first-type information block is C-Plane information.

In one embodiment, the first-type information block comprises an RRC message.

In one embodiment, the first-type information block comprises RRC connection related information.

In one embodiment, the first-type information block is transmitted through a Common Control Channel (CCCH).

In one subembodiment of the above embodiment, for the specific meaning of the CCCH, refer to section 6.2.2 in 3GPP TS38.300.

In one embodiment, the first-type information block is transmitted through a Dedicated Control Channel (DCCH).

In one subembodiment of the above embodiment, for the specific meaning of the DCCH, refer to section 6.2.2 in 3GPP TS38.300.

In one embodiment, the first-type information block is used to establish an RRC connection.

In one embodiment, the first-type information block is used to reestablish an RRC connection.

In one embodiment, the first-type information block is used to resume an RRC connection.

In one embodiment, the first-type information block comprises an RRC Connection Request.

In one embodiment, the first-type information block comprises an RRC Connection Resume Request.

In one embodiment, the first-type information block comprises an RRCConnectionRe-establishment.

In one embodiment, the first-type information block comprises an RRCHandoverConfirm.

In one embodiment, the first-type information block comprises an RRCConnectionReconfigurationComplete.

In one embodiment, the first-type information block comprises an RRC Early Data Request.

In one embodiment, the first-type information block comprises an RRCSetupRequest.

In one embodiment, the first-type information block comprises an RRCResumeRequest.

In one embodiment, the first-type information block comprises an RRCResumeRequest1.

In one embodiment, the first-type information block comprises an RRCReestablishmentRequest.

In one embodiment, the first-type information block comprises an RRCReconfigurationComplete.

In one embodiment, the second-type information block comprises small data.

In one embodiment, the second-type information block comprises U-Plane information.

In one embodiment, the second-type information block comprises a NAS message.

In one embodiment, the second-type information block comprises SDAP data.

Embodiment 8

Figure 8:
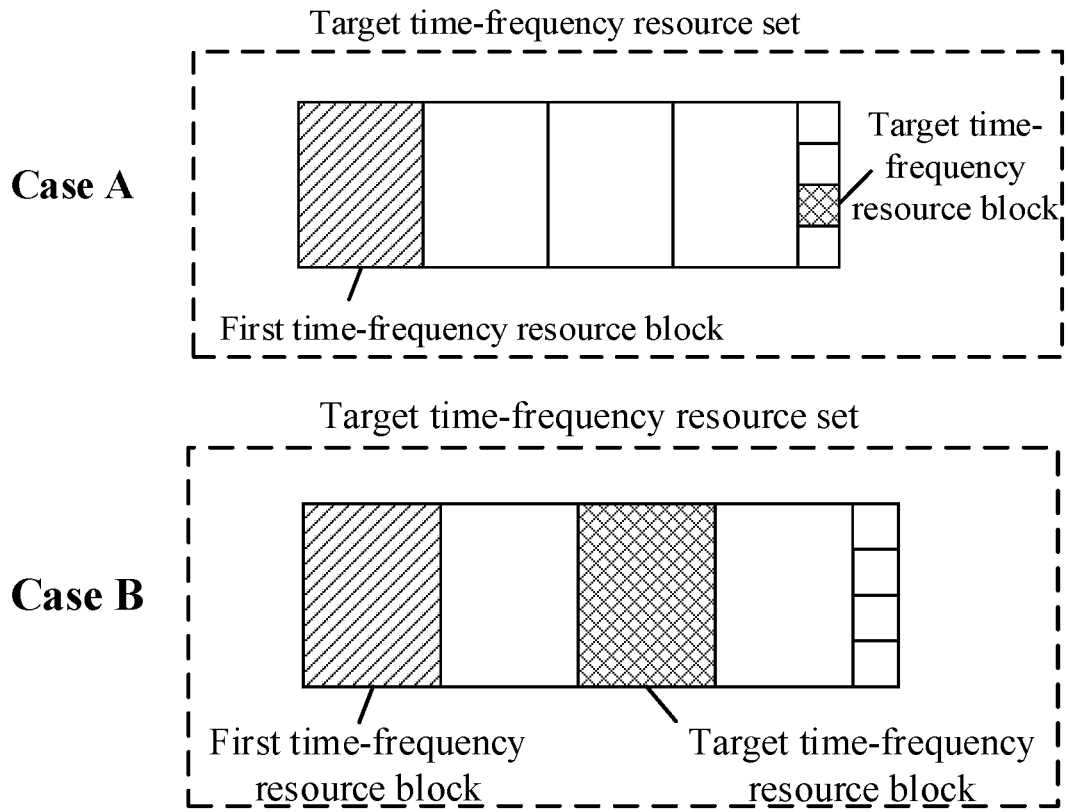
FIG. 8 illustrates a schematic diagram of relations among a first time-frequency resource block, a target time-frequency resource set and a target time-frequency resource block according to one embodiment of the present application.

Embodiment 8 illustrates a schematic diagram of relations among a first time-frequency resource block, a target time-frequency resource set and a target time-frequency resource block according to one embodiment of the present application, as shown in FIG. 8. In FIG. 8, the dotted box represents the target time-frequency resource set in the present application; the slash-filled rectangle represents the first time-frequency resource block in the present application; in case A in FIG. 8, the cross line-filled square represents the target time-frequency resource block in the present application; in case B in FIG. 8, the cross line-filled rectangle represents the target time-frequency resource block in the present application.

In embodiment 8, the target time-frequency resource set comprises a positive integer number of first-type time-frequency resource block(s) and a positive integer number of second-type time-frequency resource block(s); in case A in embodiment 8, when the third signal does not the first-type information block, the target time-frequency resource block is one of the positive integer number of second-type time-frequency resource block(s) comprised in the target time-frequency resource set; in case B in embodiment 8, when the third signal carries the first-type information block, the target time-frequency resource block is one of the positive integer number of first-type time-frequency resource block(s) comprised in the target time-frequency resource set.

In one embodiment, the target time-frequency resource block is one of the positive integer number of time-frequency resource block(s) comprised in the target time-frequency resource set.

In one embodiment, the target time-frequency resource block is the first time-frequency resource block.

In one embodiment, the target time-frequency resource block is the same as the first time-frequency resource block.

In one embodiment, when the third signal carries the first-type information block, the target time-frequency resource block is the first time-frequency resource block.

In one embodiment, when the third signal carries the first-type information block, the target time-frequency resource block is the same as the first time-frequency resource block.

In one embodiment, the target time-frequency resource block is different from the first time-frequency resource block.

In one embodiment, when the third signal does not carry the first-type information block, the target time-frequency resource block is different from the first time-frequency resource block.

In one embodiment, the target time-frequency resource block is one of the positive integer number of first-type time-frequency resource block(s) comprised in the target time-frequency resource set, or, the target time-frequency resource block is one of the positive integer number of second-type time-frequency resource block(s) comprised in the target time-frequency resource set.

In one embodiment, the target time-frequency resource block is one of the one first-type time-frequency resource block or the one second-type time-frequency resource block comprised in the target time-frequency resource set.

In one embodiment, the target time-frequency resource block is one of the first time-frequency resource block or the positive integer of second-type time-frequency resource block(s) comprised in the target time-frequency resource set.

In one embodiment, the target time-frequency resource block is one of the first-type time-frequency resource block or the one second-type time-frequency resource block comprised in the target time-frequency resource set.

In one embodiment, the target time-frequency resource block comprises a PUSCH.

In one embodiment, the target time-frequency resource block belongs to a PUSCH occasion.

In one embodiment, the target time-frequency resource block comprises a positive integer number of time-domain resource unit(s).

In one embodiment, the target time-frequency resource block comprises a positive integer number of frequency-domain resource unit(s).

In one embodiment, the target time-frequency resource block comprises a positive integer number of time-frequency resource unit(s).

In one embodiment, the target time-frequency resource comprises multiple REs.

In one embodiment, the positive integer number of frequency-domain resource unit(s) comprised in the target time-frequency resource is(are) consecutive in frequency domain.

In one embodiment, the target time-frequency resource comprises a positive integer of PRB(s).

In one embodiment, the target time-frequency resource comprises a positive integer number of consecutive PRB(s).

In one embodiment, the target time-frequency resource comprises a positive integer number of subcarrier(s).

In one embodiment, the target time-frequency resource comprises a positive integer number of subframe(s).

In one embodiment, the target time-frequency resources comprise a positive integer number of slot(s).

In one embodiment, the target time-frequency resource comprises a positive integer number of multicarrier symbol(s).

In one embodiment, the target time-frequency resource belongs to a slot, and the slot comprises a positive integer number of multicarrier symbol(s).

In one subembodiment of the above embodiment, the slot comprises 14 multicarrier symbols.

In one embodiment, the target time-frequency resource comprises a positive integer number of consecutive multicarrier symbol(s).

Embodiment 9

Figure 9:
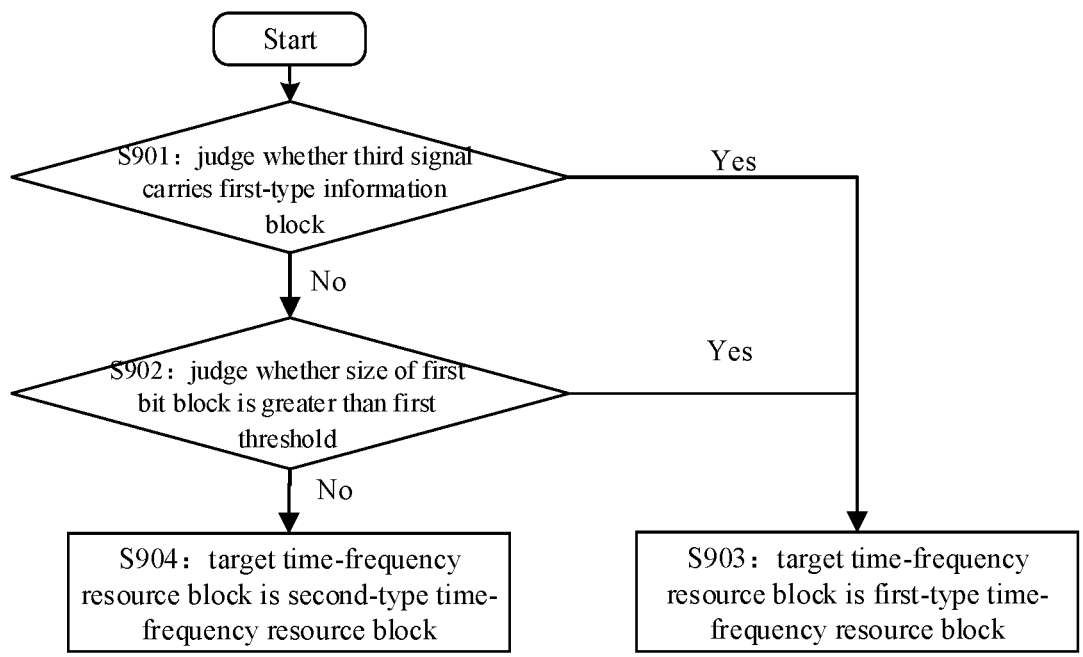
FIG. 9 illustrates a flowchart of determining a target time-frequency resource block according to one embodiment of the present application.

Embodiment 9 illustrates a flowchart for determining a target time-frequency resource block according to one embodiment of the present application, as shown in FIG. 9. In embodiment 9, in step S901, judge whether a third signal carries a first-type information block; when a result of judging whether a third signal carries a first-type information block is "yes", execute step S903, a target time-frequency resource block is a first-type time-frequency resource block; when a result of judging whether a third signal carries a first-type information block is "no", executes step S902, judge whether a size of a first bit block is greater than a first threshold; when a result of judging whether a size of a first bit block is greater than a first threshold is "yes", execute step S903, and a target time-frequency resource block is a first-type time-frequency resource block; when a result of judging whether a size of a first bit block is greater than a first threshold is "no", execute step S904, and a target time-frequency resource block is a second-type time-frequency resource block.

In one embodiment, when the third signal carries the first-type information block, the result of the judging whether a third signal carries a first-type information block is "yes".

In one embodiment, when the third signal carries the first-type information block and the second-type information block, the result of the judging whether a third signal carries a first-type information block is "yes".

In one embodiment, when the third signal does not carry the first-type information block, the result of the judging whether a third signal carries a first-type information block is "no".

In one embodiment, when the third signal carries the second-type information block and the third signal does not carry the first-type information block, the result of the judging whether a third signal carries a first-type information block is "no".

In one embodiment, when a size of the first bit block is greater than the first threshold, a result of the judging whether a size of a first bit block is greater than the first threshold is "yes".

In one embodiment, when a size of the first bit block is equal to the first threshold, a result of the judging whether a size of a first bit block is greater than the first threshold is "yes".

In one embodiment, when a size of the first bit block is less than the first threshold, a result of the judging whether a size of a first bit block is greater than the first threshold is "no".

In one embodiment, when a size of the first bit block is equal to the first threshold, a result of the judging whether a size of a first bit block is greater than the first threshold is "no".

In one embodiment, a size of the first bit block is a number of the positive integer number of bit(s) comprised in the first bit block.

In one embodiment, a size of the first bit block is a maginitude of the first-type information block.

In one embodiment, a size of the first bit block is a maginitude of the second-type information block.

In one embodiment, a size of the first bit block is a sum of a maginitude of the first-type information block and a maginitude of the second-type information block.

In one embodiment, a size of the first bit block is a magnitude of the C-Plane information comprised in the first-type information block.

In one embodiment, a size of the first bit block is a magnitude of the RRC message comprised in the first-type information block.

In one embodiment, a size of the first bit block is a magnitude of the RRC connection related information comprised in the first-type information block.

In one embodiment, a size of the first bit block is a maginitude of the small data comprised in the second-type information block.

In one embodiment, a size of the first bit block is a magnitude of the U-Plane information comprised in the second-type information block.

In one embodiment, a size of the first bit block is a magnitude of the NAS message comprised in the second-type information block.

In one embodiment, a size of the first bit block is a magnitude of the SDAP data comprised in the second-type information block.

In one embodiment, a size of the first bit block is a sum of a magnitude of the C-Plane information comprised in the first-type information block and a magnitude of the U-Plane information comprised in the second-type information block.

In one embodiment, a size of the first bit block is a sum of a magnitude of the RRC message comprised in the first-type information block and a magnitude of the NAS message comprised in the second-type information block.

In one embodiment, a size of the first bit block is a sum of a magnitude of the RRC connection connected information comprised in the first-type information block and a magnitude of the SDAP data comprised in the second-type information block.

In one embodiment, the first threshold is a positive integer.

In one embodiment, the first threshold is a positive integer number of bit(s).

In one embodiment, when the third signal carries the first-type information block, the target time-frequency resource block is one of the positive integer number of first-type time-frequency resource block(s) comprised in the target time-frequency resource set.

In one embodiment, when the third signal does not carry the first-type information block and a size of the first bit block is greater than a first threshold, the target time-frequency resource block is one of the positive integer number of first-type time-frequency resource block(s) comprised in the target time-frequency resource set.

In one embodiment, when the third signal does not carry the first-type information block and a size of the first bit block is equal to a first threshold, the target time-frequency resource block is one of the positive integer number of first-type time-frequency resource block(s) comprised in the target time-frequency resource set.

In one embodiment, when the third signal does not carry the first-type information block and a size of the first bit block is less than a first threshold, the target time-frequency resource block is one of the positive integer number of second-type time-frequency resource block(s) comprised in the target time-frequency resource set.

In one embodiment, when the third signal does not carry the first-type information block and a size of the first bit block is equal to a first threshold, the target time-frequency resource block is one of the positive integer number of second-type time-frequency resource block(s) comprised in the target time-frequency resource set.

In one embodiment, when the third signal does not carry the first-type information block, the third signal carries the second-type information block and a size of the first bit block is greater than a first threshold, the target time-frequency resource block is one of the positive integer number of first-type time-frequency resource block(s) comprised in the target time-frequency resource set.

In one embodiment, when the third signal does not carry the first-type information block, the third signal carries the second-type information block and a size of the first bit block is equal to a first threshold, the target time-frequency resource block is one of the positive integer number of first-type time-frequency resource block(s) comprised in the target time-frequency resource set.

In one embodiment, when the third signal does not carry the first-type information block, the third signal carries the second-type information block and a size of the first bit block is less than a first threshold, the target time-frequency resource block is one of the positive integer number of second-type time-frequency resource block(s) comprised in the target time-frequency resource set.

In one embodiment, when the third signal does not carry the first-type information block, the third signal carries the second-type information block and a size of the first bit block is equal to a first threshold, the target time-frequency resource block is one of the positive integer number of second-type time-frequency resource block(s) comprised in the target time-frequency resource set.

Embodiment 10

Figure 10:
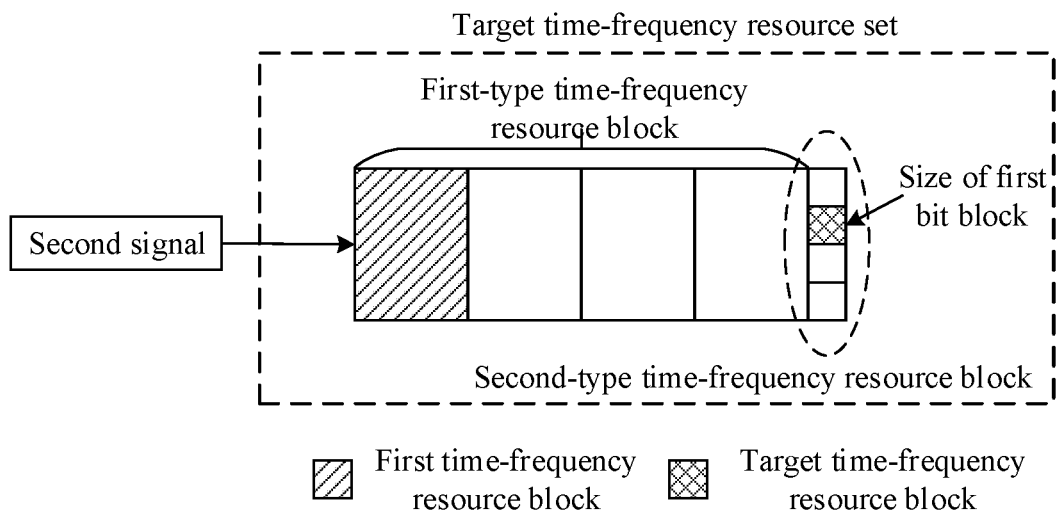
FIG. 10 illustrates a schematic diagram of a relation between a size of a first bit block and a target time-frequency resource block according to one embodiment of the present application.

Embodiment 10 illustrates a schematic diagram of a relation between a size of a first bit block and a target time-frequency resource block according to one embodiment of the present application, as shown in FIG. 10. In FIG. 10 the big dotted box represents the target time-frequency resource set in the present application; the rectangle represents a first-type time-frequency resource block in the target time-frequency resource set in the present application, and the square in the dotted ellipse represents a first-type time-frequency resource block in the target time-frequency resource set; the slash-filled rectangle represents the first time-frequency resource block in the present application; and the cross line-filled square represents the target time-frequency resource block in the present application.

In embodiment 10, the first signaling is used to indicate the positive integer number of second-type time-frequency resource block(s) comprised in the target time-frequency resource set, and the first time-frequency resource block is one of the positive integer number of first-type time-frequency resource block(s) comprised in the target time-frequency resource set; when the third signal does not carry the first-type information block, the size of the first bit block is used to determine the target time-frequency resource block out of the positive integer number of second-type time-frequency resource block(s).

In one embodiment, the first signaling is a broadcast signal.

In one embodiment, the first signaling is an SIB signal.

In one embodiment, the first signaling is one or multiple IEs in an SIB.

In one embodiment, the first signaling is one or multiple fields in an SIB.

In one embodiment, the first signaling is a higher-layer signaling.

In one embodiment, the first signaling is an RRC signaling.

In one embodiment, the first signaling is one or multiple fields in an RRC IE.

In one embodiment, the first signaling is used to determine Q1 second-type time-frequency resource block(s) in the target time-frequency resource set, and the Q1 second-type time-frequency resource block(s) does(do) not comprise the first-type time-frequency resource block; when the target time-frequency resource block belongs to the Q1 time-frequency resource block(s), a service type of the first bit block is used to determine the target time-frequency resource block out of the Q1 second-type time-frequency resource block(s), Q1 being a positive integer.

In one embodiment, the first signaling is used to determine Q1 second-type time-frequency resource block(s) in the target time-frequency resource set, and the Q1 second-type time-frequency resource block(s) does(do) not comprise the first-type time-frequency resource block; when the target time-frequency resource block belongs to the Q1 time-frequency resource block(s), a size of the first bit block is used to determine the target time-frequency resource block out of the Q1 second-type time-frequency resource block(s), Q1 being a positive integer.

In one embodiment, magnitudes of any two second-type time-frequency resource blocks among the Q1 second-type time-frequency resource blocks comprised in the target time-frequency resource set are the same.

In one embodiment, magnitudes of at least two of the Q1 time-frequency resource blocks comprised in the target time-frequency resource set are different.

Embodiment 11

Figure 11:
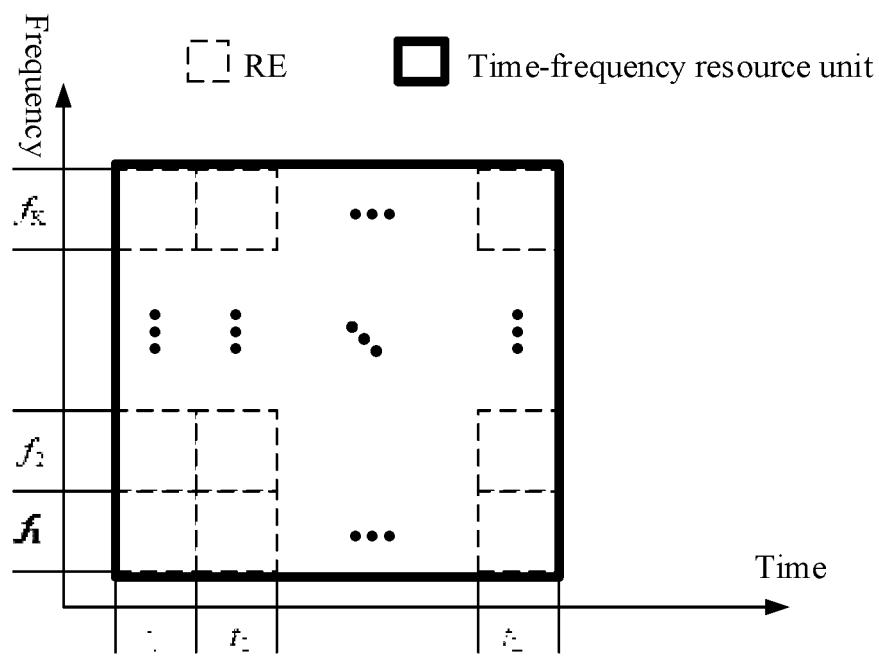
FIG. 11 illustrates a schematic diagram of a time-frequency resource unit according to one embodiment of the present application.

Embodiment 11 illustrates a schematic diagram of a time-frequency resource unit according to one embodiment of the present application, as shown in FIG. 11. In FIG. 11, a small dotted box represents a Resource Element (RE), and a bold box represents a time-frequency resource unit. In FIG. 11, a time-frequency resource unit occupies K subcarrier(s) in frequency domain, and L multicarrier symbol(s) in time domain, K and L being positive integers. In FIG. 11, $t_1$, $t_2$, ..., $t_L$ represents(represent) the L symbol(s), and $f_1$, $f_2$, ..., $f_K$ represents(represent) the K subcarrier(s).

In Embodiment 11, a time-frequency resource unit occupies the K subcarrier(s) in frequency domain and the L multicarrier symbol(s) in time domain, K and L being positive integers.

In one embodiment, K is equal to 12.
In one embodiment, K is equal to 72.
In one embodiment, K is equal to 127.
In one embodiment, K is equal to 240.
In one embodiment, L is equal to 1.
In one embodiment, L is equal to 2.
In one embodiment, L is not greater than 14.
In one embodiment, any of the L multicarrier symbol(s) is an OFDM symbol.
In one embodiment, any of the L multicarrier symbol(s) is an SC-FDMA symbol.
In one embodiment, any of the L multicarrier symbol(s) is a DFT-S-OFDM symbol.
In one embodiment, any of the L multicarrier symbol(s) is a Frequency Division Multiple Access (FDMA) symbol.
In one embodiment, any of the L multicarrier symbol(s) is a Filter Bank Multicarrier (FBMC) symbol.
In one embodiment, any of the L multicarrier symbol(s) is an Interleaved Frequency Division Multiple Access (IFDMA) symbol.
In one embodiment, the time-domain resource unit comprises a positive integer number of radio frame(s).
In one embodiment, the time-domain resource unit comprises a positive integer number of subframe(s).
In one embodiment, the time-domain resource unit comprises a positive integer number of slot(s).
In one embodiment, the time-domain resource unit is a slot.
In one embodiment, the time-domain resource unit comprises a positive integer number of multicarrier symbol(s).

In one embodiment, the frequency-domain resource unit comprises a positive integer number of carrier(s).

In one embodiment, the frequency-domain resource unit comprises a positive integer number of Bandwidth Part(s) (BWP(s)).

In one embodiment, the frequency-domain resource unit is a BWP.

In one embodiment, the frequency-domain resource unit comprises a positive integer number of subchannel(s).

In one embodiment, the frequency-domain resource unit is a subchannel.

In one embodiment, any of the positive integer number of sub-channel(s) comprises a positive integer number of Resource Block(s) (RB(s)).

In one embodiment, the sub-channel comprises a positive integer number of RB(s).

In one embodiment, any of the positive integer number of RB(s) comprises a positive integer number of subcarrier(s) in frequency domain.

In one embodiment, any of the positive integer number of RB(s) comprises 12 subcarriers in frequency domain.

In one embodiment, the sub-channel comprises a positive integer number of PRB(s).

In one embodiment, a number of PRB(s) comprised in the one subchannel is variable.

In one embodiment, any of the positive integer number of PRB(s) comprises a positive integer number of subcarrier(s) in frequency domain.

In one embodiment, any of the positive integer number of PRB(s) comprises 12 subcarriers in frequency domain.

In one embodiment, the frequency-domain resource unit comprises a positive integer number of RB(s).

In one embodiment, the frequency-domain resource unit is an RB.

In one embodiment, the frequency-domain resource unit comprises a positive integer number of PRB(s).

In one embodiment, the frequency-domain resource unit is an PRB.

In one embodiment, the frequency-domain resource unit comprises a positive integer number of subcarrier(s).

In one embodiment, the frequency-domain resource unit is a subcarrier.

In one embodiment, the time-frequency resource unit comprises the time-domain resource unit.

In one embodiment, the time-frequency resource unit comprises the frequency-domain resource unit.

In one embodiment, the time-frequency resource unit comprises the time-domain resource unit and the frequency-domain resource unit.

In one embodiment, the time-frequency resource unit comprises R RE(s), R being a positive integer.

In one embodiment, the time-frequency resource unit consists of R RE(s), R being a positive integer.

In one embodiment, any of the R RE(s) occupies a multicarrier symbol in time domain and a subcarrier in frequency domain.

In one embodiment, the SCS is measured by Hertz (Hz).

In one embodiment, the SCS is measured by Kilohertz (kHz).

In one embodiment, the SCS is measured by Megahertz (MHz).

In one embodiment, a symbol length of the multicarrier symbol is measured by sampling point.

In one embodiment, a symbol length of the multicarrier symbol is measured by microsecond (μs).

In one embodiment, a symbol length of the multicarrier symbol is measured by millisecond (ms).

In one embodiment, the SCS is at least one of 1.25 kHz, 2.5 kHz, 5 kHz, 15 kHz, 30 kHz, 60 kHz, 120 kHz or 240 kHz.

In one embodiment, the time-frequency resource unit comprises the K subcarrier(s) and the L multicarrier symbol(s), and a product of K and L is not less than R.

In one embodiment, the time-frequency resource unit does not comprise an RE allocated to a Guard Period (GP).

In one embodiment, the time-frequency resource unit does not comprise an RE allocated to a Reference Signal (RS).

In one embodiment, the time-frequency resource unit comprises a positive integer number of RB(s).

In one embodiment, the time-frequency resource unit belongs to an RB.

In one embodiment, the time-frequency resource unit is equal to an RB in frequency domain.

In one embodiment, the time-frequency resource unit comprises 6 RBs in frequency domain.

In one embodiment, the time-frequency resource unit comprises 20 RBs in frequency domain.

In one embodiment, the time-frequency resource unit comprises a positive integer number of PRB(s).

In one embodiment, the time-frequency resource unit belongs to a PRB.

In one embodiment, the time-frequency resource unit is equal to a PRB in frequency domain.

In one embodiment, the time-frequency resource unit comprises a positive integer number of Virtual Resource Block(s) (VRB(s)).

In one embodiment, the time-frequency resource unit belongs to a VRB.

In one embodiment, the time-frequency resource unit is equal to a VRB in frequency domain.

In one embodiment, the time-frequency resource unit comprises a positive integer number of PRB pair(s)

In one embodiment, the time-frequency resource unit belongs to a PRB pair.

In one embodiment, the time-frequency resource unit is equal to a PRB pair in frequency domain.

In one embodiment, the time-frequency resource unit comprises a positive integer number of radio frame(s).

In one embodiment, the time-frequency resource unit belongs to a radio frame.

In one embodiment, the time-frequency resource unit is equal to a radio frame in time domain.

In one embodiment, the time-frequency resource unit comprises a positive integer number of subframe(s).

In one embodiment, the time-frequency resource unit belongs to a subframe.

In one embodiment, the time-frequency resource unit is equal to a subframe in time domain.

In one embodiment, the time-frequency resource unit comprises a positive integer number of slot(s).

In one embodiment, the time-frequency resource unit belongs to a slot.

In one embodiment, the time-frequency resource unit is equal to a slot in time domain.

In one embodiment, the time-frequency resource unit comprises a positive integer number of Symbol(s).

In one embodiment, the time-frequency resource unit belongs to a Symbol.

In one embodiment, the time-frequency resource unit is equal to a Symbol in time domain.

In one embodiment, a duration of the time-domain resource unit in the present application is equal to a duration of the time-frequency resource unit in time domain in the present application.

In one embodiment, a number of multicarrier symbol(s) occupied by the time-frequency resource unit in time domain in the present application is equal to a number of multicarrier symbol(s) occupied by the time-domain resource unit in time domain in the present application.

In one embodiment, a number of subcarrier(s) occupied by the frequency-domain resource unit in the present application is equal to a number of subcarrier(s) occupied by the time-frequency resource unit in frequency domain in the present application.

Embodiment 12

Figure 12:
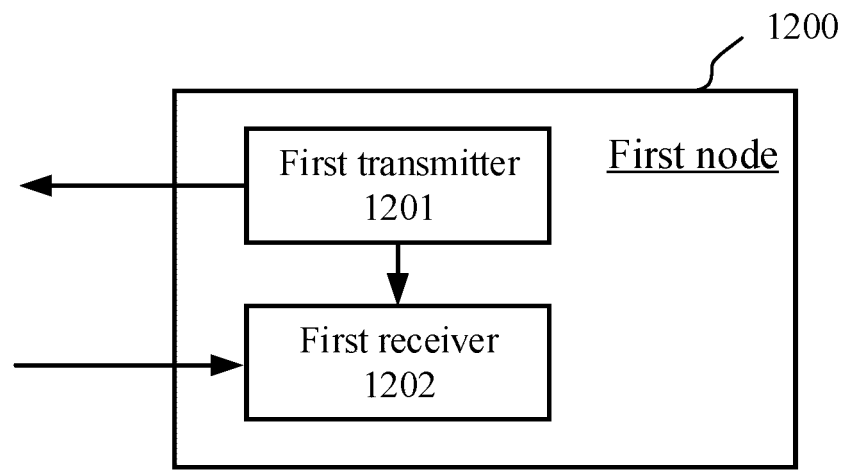
FIG. 12 illustrates a structure block diagram of a processing device in a first node according to one embodiment of the present application.

Embodiment 12 illustrates a structure block diagram of a processing device used in a first node, as shown in FIG. 12. In Embodiment 12, a processor 1200 in the first node mainly consists of a first transmitter 1201 and a first receiver 1202.

In one embodiment, the first transmitter 1201 comprises at least one of the antenna 452, the transmitter/receiver 454, the multi-antenna transmitting processor 457, the transmitting processor 468, the controller/processor 459, the memory 460 or the data source 467 in FIG. 4 of the present application.

In one embodiment, the first receiver 1202 comprises at least one of the antenna 452, the transmitter/receiver 454, the multi-antenna receiving processor 458, the receiving processor 456, the controller/processor 459, the memory 460 or the data source 467 in FIG. 4 of the present application.

In embodiment 12, the first transmitter 1201 transmits a first signal, and the first signal carries a first signature sequence;

the first receiver 1202 receives a second signal, the second signal carries a first identifier, the first signature sequence is used to indicate the first identifier; and the first transmitter 1201 transmits a third signal on a target time-frequency resource block; the second signal is used to indicate a first time-frequency resource block, the first time-frequency resource block is used to determine a target time-frequency resource set, the target time-frequency resource set comprises multiple time-frequency resource blocks, and the first time-frequency resource block is one of the multiple time-frequency resource blocks comprised in the target time-frequency resource set; the target time-frequency resource block is one of the multiple time-frequency resource blocks comprised in the target time-frequency resource set, and whether the third signal carries a first-type information block is used to determine the target time-frequency resource block out of the target time-frequency resource set;

the first-type information block comprises C-Plane information.

In one embodiment, the first-type information block comprises one of RRC Setup Request, RRC Resume Request, RRC Resume Request1, RRC Reestablishment Request, RRC Reconfiguration Complete, RRC Handover Confirm or RRC Early Data Request.

In one embodiment, the target time-frequency resource set comprises a positive integer number of first-type time-frequency resource block(s) and a positive integer number of second-type time-frequency resource block(s); when the third signal carries the first-type information block, the target time-frequency resource block is one of the positive integer number of first-type time-frequency resource block(s) comprised in the target time-frequency resource set; when the third signal does not carry the first-type information block, the target time-frequency resource block is one of the positive integer number of second-type time-frequency resource block(s) comprised in the target time-frequency resource set.

In one embodiment, a first bit block is used to generate the third signal, and a size of the first bit block is used to determine the target time-frequency resource block out of the target time-frequency resource set.

In one embodiment, when the size of the first bit block is greater than a first threshold, the target time-frequency resource block is one of the positive integer number of first-type time-frequency resource block(s) comprised in the target time-frequency resource set; when the size of the first bit block is less than the first threshold, the target time-frequency resource block is one of the positive integer number of second-type time-frequency resource block(s) comprised in the target time-frequency resource set.

In one embodiment, the first receiver 1202 receives a first signaling; the first signaling is used to indicate the positive integer number of second-type time-frequency resource block(s) comprised in the target time-frequency resource set, and the first time-frequency resource block is one of the positive integer number of first-type time-frequency resource block(s) comprised in the target time-frequency resource set; when the third signal does not carry the first-type information block, the size of the first bit block is used to determine the target time-frequency resource block out of the positive integer number of second-type time-frequency resource block(s).

In one embodiment, the first receiver 1202 receives a fourth signal; the third signal comprises a first identity; both the first identity and the target time-frequency resource block is used to determine the fourth signal.

In one embodiment, the first node 1200 is a UE.
In one embodiment, the first node 1200 is a relay node.
In one embodiment, the first node 1200 is a base station.

Embodiment 13

Figure 13:
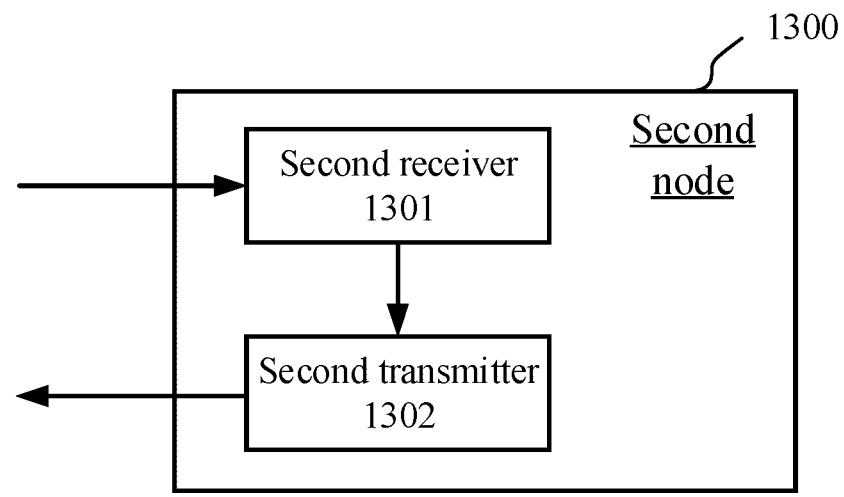
FIG. 13 illustrates a structure block diagram of a processing device in a second node according to one embodiment of the present application.

Embodiment 13 illustrates a structure block diagram of a processing device used in a second node, as shown in FIG. 13. In FIG. 13, a processor 1300 in the second node mainly consists of a second receiver 1301 and a second transmitter 1302.

In one embodiment, the second receiver 1301 comprises at least one of the antenna 420, the transmitter/receiver 418, the multi-antenna receiving processor 472, the receiving processor 470, the controller/processor 475 or the memory 476 in FIG. 4 of the present application.

In one embodiment, the second transmitter 1302 comprises at least one of the antenna 420, the transmitter/receiver 418, the multi-antenna transmitting processor 471, the transmitting processor 416, the controller/processor 475 or the memory 476 in FIG. 4 of the present application.

In embodiment 13, the second receiver 1301 receives a first signal, and the first signal carries a first signature sequence;

the second transmitter 1302 transmits a second signal, the second signal carries a first identifier, and the first signature sequence indicates the first identifier; the second receiver 1301 receives a third signal on a target time-frequency resource block; the second signal indicates a first time-frequency resource block, the first time-frequency resource block is used to determine a target time-frequency resource set, the target time-frequency resource set comprises multiple time-frequency resource blocks, and the first time-frequency resource block is one of the multiple time-frequency resource blocks comprised in the target time-frequency resource set; the target time-frequency resource block is one of the multiple time-frequency resource blocks comprised in the target time-frequency resource set, and whether the third signal carries a first-type information block is used to determine the target time-frequency resource block out of the target time-frequency resource set; the first-type information block comprises C-Plane information.

In one embodiment, the first-type information block comprises one of RRC Setup Request, RRC Resume Request, RRC Resume Request1, RRC Reestablishment Request, RRC Reconfiguration Complete, RRC Handover Confirm or RRC Early Data Request.

In one embodiment, the target time-frequency resource set comprises a positive integer number of first-type time-frequency resource block(s) and a positive integer number of second-type time-frequency resource block(s); when the third signal carries the first-type information block, the target time-frequency resource block is one of the positive integer number of first-type time-frequency resource block(s) comprised in the target time-frequency resource set; when the third signal does not carry the first-type information block, the target time-frequency resource block is one of the positive integer number of second-type time-frequency resource block(s) comprised in the target time-frequency resource set.

In one embodiment, a first bit block is used to generate the third signal, and a size of the first bit block is used to determine the target time-frequency resource block out of the target time-frequency resource set.

In one embodiment, when the size of the first bit block is greater than a first threshold, the target time-frequency resource block is one of the positive integer number of first-type time-frequency resource block(s) comprised in the target time-frequency resource set; when the size of the first bit block is less than the first threshold, the target time-frequency resource block is one of the positive integer number of second-type time-frequency resource block(s) comprised in the target time-frequency resource set.

In one embodiment, the second transmitter 1302 transmits a first signaling; the first signaling indicates the positive integer number of second-type time-frequency resource block(s) comprised in the target time-frequency resource set, and the first time-frequency resource block is one of the positive integer number of first-type time-frequency resource block(s) comprised in the target time-frequency resource set; when the third signal does not carry the first-type information block, the size of the first bit block is used to determine the target time-frequency resource block out of the positive integer number of second-type time-frequency resource block(s).

In one embodiment, the second transmitter 1302 transmits a fourth signal; the third signal comprises a first identity; both the first identity and the target time-frequency resource block are used to generate the fourth signal.

In one embodiment, the second node 1300 is a UE.

In one embodiment, the second node 1300 is a base station.

In one embodiment, the second node 1300 is a relay node.

The ordinary skill in the art may understand that all or part of steps in the above method may be implemented by instructing related hardware through a program. The program may be stored in a computer readable storage medium, for example Read-Only Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The first node in the present application includes but is not limited to mobile phones, tablet computers, notebooks, network cards, low-consumption equipment, enhanced MTC (eMTC) terminals, NB-IOT terminals, vehicle-mounted communication equipment, aircrafts, diminutive airplanes, unmanned aerial vehicles, telecontrolled aircrafts and other wireless communication devices. The second node in the present application includes but is not limited to mobile phones, tablet computers, notebooks, network cards, low-consumption equipment, enhanced MTC (eMTC) terminals, NB-IOT terminals, vehicle-mounted communication equipment, aircrafts, diminutive airplanes, unmanned aerial vehicles, telecontrolled aircrafts and other wireless communication devices. The UE or terminal in the present application includes but is not limited to mobile phones, tablet computers, notebooks, network cards, low-consumption equipment, enhanced MTC (eMTC) terminals, NB-IOT terminals, vehicle-mounted communication equipment, aircrafts, diminutive airplanes, unmanned aerial vehicles, telecontrolled aircrafts, etc. The base station or network side equipment in the present application includes but is not limited to macro-cellular base stations, micro-cellular base stations, home base stations, relay base station, eNB, gNB, Transmitter Receiver Point (TRP), GNSS, relay satellites, satellite base stations, space base stations and other radio communication equipment.

The above are merely the preferred embodiments of the present application and are not intended to limit the scope of protection of the present application. Any modification, equivalent substitute and improvement made within the spirit and principle of the present application are intended to be included within the scope of protection of the present application.

What is claimed is:

1. A first node for wireless communications, comprising:
a first transmitter, transmitting a first signal, the first signal carrying a first signature sequence;
a first receiver, receiving a second signal, the second signal carrying a first identifier, the first signature sequence being used to indicate the first identifier; and
the first transmitter, transmitting a third signal on a target time-frequency resource block;
wherein the second signal is used to indicate a first time-frequency resource block, the first time-frequency resource block is used to determine a target time-frequency resource set, the target time-frequency resource set comprises multiple time-frequency resource blocks, and the first time-frequency resource block is one of the multiple time-frequency resource blocks comprised in the target time-frequency resource set; the target time-frequency resource block is one of the multiple time-frequency resource blocks comprised in the target time-frequency resource set, and whether the third signal carries a first-type information block is used to determine the target time-frequency resource block out of the target time-frequency resource set; the first-type information block comprises control-plane information; the first signal is transmitted on a random access channel.

2. The first node according to claim 1, wherein the first-type information block comprises one of Radio Resource Control (RRC) Setup Request, RRC Resume Request, RRC Resume Request1, RRC Reestablishment Request, RRC Reconfiguration Complete, RRC Handover Confirm or RRC Early Data Request.

3. The first node according to claim 1, wherein the target time-frequency resource set comprises a positive integer number of first-type time-frequency resource block(s) and a positive integer number of second-type time-frequency resource block(s); when the third signal carries the first-type information block, the target time-frequency resource block is one of the positive integer number of first-type time-frequency resource block(s) comprised in the target time-frequency resource set; when the third signal does not carry the first-type information block, the target time-frequency resource block is one of the positive integer number of second-type time-frequency resource block(s) comprised in the target time-frequency resource set.

4. The first node according to claim 1, wherein a first bit block is used to generate the third signal, and a size of the first bit block is used to determine the target time-frequency resource block out of the target time-frequency resource set.

5. The first node according to claim 4, wherein the target time-frequency resource set comprises a positive integer number of first-type time-frequency resource block(s) and a positive integer number of second-type time-frequency resource block(s); when the size of the first bit block is greater than a first threshold, the target time-frequency resource block is one of the positive integer number of first-type time-frequency resource block(s) comprised in the target time-frequency resource set; when the size of the first bit block is less than the first threshold, the target time-frequency resource block is one of the positive integer number of second-type time-frequency resource block(s) comprised in the target time-frequency resource set.

6. The first node according to claim 4, wherein
the first receiver, receiving a first signaling;
wherein the target time-frequency resource set comprises a positive integer number of first-type time-frequency resource block(s) and a positive integer number of second-type time-frequency resource block(s); the first signaling is used to indicate the positive integer number of second-type time-frequency resource block(s) comprised in the target time-frequency resource set, and the first time-frequency resource block is one of the positive integer number of first-type time-frequency resource block(s) comprised in the target time-frequency resource set; when the third signal does not carry the first-type information block, the size of the first bit block is used to determine the target time-frequency resource block out of the positive integer number of second-type time-frequency resource block(s).

7. The first node according to claim 1, wherein
the first receiver, receiving a fourth signal;
wherein the third signal comprises a first identity; both the first identity and the target time-frequency resource block are used to determine the fourth signal.

8. A second node for wireless communications, comprising:
a second receiver, receiving a first signal, the first signal carrying a first signature sequence;
a second transmitter, transmitting a second signal, the second signal carrying a first identifier, the first signature sequence indicating the first identifier; and
receiving a third signal on a target time-frequency resource block;
wherein the second signal indicates a first time-frequency resource block, the first time-frequency resource block is used to determine a target time-frequency resource set, the target time-frequency resource set comprises multiple time-frequency resource blocks, and the first time-frequency resource block is one of the multiple time-frequency resource blocks comprised in the target time-frequency resource set; the target time-frequency resource block is one of the multiple time-frequency resource blocks comprised in the target time-frequency resource set, and whether the third signal carries a first-type information block is used to determine the target time-frequency resource block out of the target time-frequency resource set; the first-type information block comprises control-plane information.

9. The second node according to claim 8, wherein the first-type information block comprises one of RRC Setup Request, RRC Resume Request, RRC Resume Request1, RRC Reestablishment Request, RRC Reconfiguration Complete, RRC Handover Confirm or RRC Early Data Request.

10. The second node according to claim 8, wherein the target time-frequency resource set comprises a positive integer number of first-type time-frequency resource block(s) and a positive integer number of second-type time-frequency resource block(s); when the third signal carries the first-type information block, the target time-frequency resource block is one of the positive integer number of first-type time-frequency resource block(s) comprised in the target time-frequency resource set; when the third signal does not carry the first-type information block, the target time-frequency resource block is one of the positive integer number of second-type time-frequency resource block(s) comprised in the target time-frequency resource set.

11. The second node according to claim 8, wherein a first bit block is used to generate the third signal, and a size of the first bit block is used to determine the target time-frequency resource block out of the target time-frequency resource set.

12. The second node according to claim 11, wherein the target time-frequency resource set comprises a positive integer number of first-type time-frequency resource block(s) and a positive integer number of second-type time-frequency resource block(s); when the size of the first bit block is greater than a first threshold, the target time-frequency resource block is one of the positive integer number of first-type time-frequency resource block(s) comprised in the target time-frequency resource set; when the size of the first bit block is less than the first threshold, the target time-frequency resource block is one of the positive integer number of second-type time-frequency resource block(s) comprised in the target time-frequency resource set.

13. The second node according to claim 11, comprising:
transmitting a first signaling;
wherein the target time-frequency resource set comprises a positive integer number of first-type time-frequency resource block(s) and a positive integer number of second-type time-frequency resource block(s); the first signaling indicates the positive integer number of second-type time-frequency resource block(s) comprised in the target time-frequency resource set, and the first time-frequency resource block is one of the positive integer number of first-type time-frequency resource block(s) comprised in the target time-frequency resource set; when the third signal does not carry the first-type information block, the size of the first bit block is used to determine the target time-frequency resource block out of the positive integer number of second-type time-frequency resource block(s).

14. The second node according to claim 8, comprising:
transmitting a fourth signal;
wherein the third signal comprises a first identity; both the first identity and the target time-frequency resource block are used to generate the fourth signal.

15. A method in a first node for wireless communications, comprising:
transmitting a first signal, the first signal carrying a first signature sequence;
receiving a second signal, the second signal carrying a first identifier, the first signature sequence being used to indicate the first identifier; and
transmitting a third signal on a target time-frequency resource block;
wherein the second signal is used to indicate a first time-frequency resource block, the first time-frequency resource block is used to determine a target time-frequency resource set, the target time-frequency resource set comprises multiple time-frequency resource blocks, and the first time-frequency resource block is one of the multiple time-frequency resource blocks comprised in the target time-frequency resource set; the target time-frequency resource block is one of the multiple time-frequency resource blocks comprised in the target time-frequency resource set, and whether the third signal carries a first-type information block is used to determine the target time-frequency resource block out of the target time-frequency resource set; the first-type information block comprises control-plane information; the first signal is transmitted on a random access channel.

16. The method according to claim 15, wherein the target time-frequency resource set comprises a positive integer number of first-type time-frequency resource block(s) and a positive integer number of second-type time-frequency resource block(s); when the third signal carries the first-type information block, the target time-frequency resource block is one of the positive integer number of first-type time-frequency resource block(s) comprised in the target time-frequency resource set; when the third signal does not carry the first-type information block, the target time-frequency resource block is one of the positive integer number of second-type time-frequency resource block(s) comprised in the target time-frequency resource set.

17. The method according to claim 16, wherein a first bit block is used to generate the third signal, and a size of the first bit block is used to determine the target time-frequency resource block out of the target time-frequency resource set.

18. The method according to claim 17, wherein the target time-frequency resource set comprises a positive integer number of first-type time-frequency resource block(s) and a positive integer number of second-type time-frequency resource block(s); when the size of the first bit block is greater than a first threshold, the target time-frequency resource block is one of the positive integer number of first-type time-frequency resource block(s) comprised in the target time-frequency resource set; when the size of the first bit block is less than the first threshold, the target time-frequency resource block is one of the positive integer number of second-type time-frequency resource block(s) comprised in the target time-frequency resource set.

19. The method according to claim 17, comprising:
receiving a first signaling;
wherein the target time-frequency resource set comprises a positive integer number of first-type time-frequency resource block(s) and a positive integer number of second-type time-frequency resource block(s); the first signaling is used to indicate the positive integer number of second-type time-frequency resource block(s) comprised in the target time-frequency resource set, and the first time-frequency resource block is one of the positive integer number of first-type time-frequency resource block(s) comprised in the target time-frequency resource set; when the third signal does not carry the first-type information block, the size of the first bit block is used to determine the target time-frequency resource block out of the positive integer number of second-type time-frequency resource block(s).

20. A method in a second node for wireless communications, comprising:
receiving a first signal, the first signal carrying a first signature sequence;
transmitting a second signal, the second signal carrying a first identifier, the first signature sequence indicating the first identifier; and
receiving a third signal on a target time-frequency resource block;
wherein the second signal indicates a first time-frequency resource block, the first time-frequency resource block is used to determine a target time-frequency resource set, the target time-frequency resource set comprises multiple time-frequency resource blocks, and the first time-frequency resource block is one of the multiple time-frequency resource blocks comprised in the target time-frequency resource set; the target time-frequency resource block is one of the multiple time-frequency resource blocks comprised in the target time-frequency resource set, and whether the third signal carries a first-type information block is used to determine the target time-frequency resource block out of the target time-frequency resource set; the first-type information block comprises control-plane information.

* * * * *